United States Patent
Koyama et al.

(10) Patent No.: US 11,199,884 B2
(45) Date of Patent: Dec. 14, 2021

(54) OPTIMIZATION DEVICE AND METHOD OF CONTROLLING OPTIMIZATION DEVICE UTILIZING A SPIN BIT

(71) Applicant: FUJITSU LIMITED, Kawasaki (JP)

(72) Inventors: Jumpei Koyama, Setagaya (JP); Motomu Takatsu, Shinjuku (JP)

(73) Assignee: FUJITSU LIMITED, Kawasaki (JP)

( * ) Notice: Subject to any disclaimer, the term of this patent is extended or adjusted under 35 U.S.C. 154(b) by 59 days.

(21) Appl. No.: 16/848,887

(22) Filed: Apr. 15, 2020

(65) Prior Publication Data
US 2020/0363848 A1 Nov. 19, 2020

(30) Foreign Application Priority Data
May 13, 2019 (JP) .............................. JP2019-090351

(51) Int. Cl.
G06F 12/06 (2006.01)
G06F 1/20 (2006.01)
G06F 9/445 (2018.01)

(52) U.S. Cl.
CPC .......... G06F 1/206 (2013.01); G06F 9/44505 (2013.01)

(58) Field of Classification Search
CPC ................................................. G06F 12/0646
USPC ........................................................ 713/100
See application file for complete search history.

(56) References Cited

U.S. PATENT DOCUMENTS

2015/0310346 A1* 10/2015 Shiraki .................. G06N 7/005
706/12
2019/0244098 A1* 8/2019 Tsukamoto .......... G06N 3/0472
2020/0089728 A1* 3/2020 Kondou ................... G06F 17/11
2020/0166900 A1* 5/2020 Koyama ................ G06Q 10/00
2020/0209813 A1* 7/2020 Matsubara ............. G06N 7/005
2020/0278385 A1* 9/2020 Matsubara ............. G06N 5/003
2021/0034999 A1* 2/2021 Yabe ...................... G06N 7/005

FOREIGN PATENT DOCUMENTS

JP H09-231197 A 9/1997

OTHER PUBLICATIONS

Yuji Sugita et al., "Replica-exchange Molecular Dynamics Method for Protein Folding", Chemical Physics Letters 314 (1999), pp. 141-151, Nov. 26, 1999 (Total 11 pages).

(Continued)

Primary Examiner — Suresh Suryawanshi
(74) Attorney, Agent, or Firm — Fujitsu Patent Center

(57) ABSTRACT

An optimization device includes: a processor; and search circuits configured to determine energy values for combinations of two state variables of a state variables, based on weight values each indicating strength of connection between the two state variables, and values of the two state variables, determine values of the state variables, based on results of comparison between evaluation values obtained by adding a noise value corresponding to a temperature to each energy value, and a threshold value, and be set to be equal to each other in connection states between the state variables based on the weight values, the processor is configured to: determine an exchange count, based on a difference between a temperature set for a search circuit corresponding to the lowest energy value, and a minimum temperature; set a temperature for each search circuit; and exchange the set temperatures between the search circuits for the exchange count.

7 Claims, 21 Drawing Sheets

(56) References Cited

OTHER PUBLICATIONS

Li, Yaohang et al.,"Hybrid parallel tempering and simulated annealing method", Applied Mathematics and Computation, Elsevier, US, vol. 212, No. 1, Jun. 2009, pp. 216-228, XP026085856.
Chen, Ding-Jun et al.,"Parallelizing simulated annealing algorithms based on high-performance computer", Journal of Global Optimization, Kluwer Academic Publishers, DO, vol. 39, No. 2, Feb. 20, 2007. pp. 261-289. XP019529771.
Munakata, Toyonori et al.,"Temperature control for simulated annealing", Physical Review E. Statistical Physics, Plasmas, Fluids, and Related Interdisciplinary Topics., vol. 64, No. 4, Sep. 2001, pp. 046127-1-046127-5, XP055685109.
Azizi, Nader et al.,"Adaptive temperature control for simulated annealing: a comparative study", Computers and Operations Research, vol. 31, No. 14, Dec. 2004, pp. 2439-2451, XP055685111.
Kirkpatrick, S. et al.,"Optimization by Simulated Annealing", Science, American Association for the Advancement of Science, US, vol. 220, No. 4598, May 13, 1983, pp. 671-680, XP000575729.
Ingber, Lester, "ASA Options", 2012, pp. 1-22, XP055499224, Retrieved from the Internet: URL:https://www.researchgate.net/publication/235426530 Adaptive Simulated_Annealing [retrieved on Aug. 13, 2018].
Du, Ke-Lin et al.,"Simulated Annealing" In:"Search and Optimization by Metaheuristics", 2016, Springer International Publishing, Cham, pp. 29-36, XP055489122.
Extended European Search Report dated Oct. 26, 2020 for corresponding European Patent Application No. 20168869.4, 11 pages.

\* cited by examiner

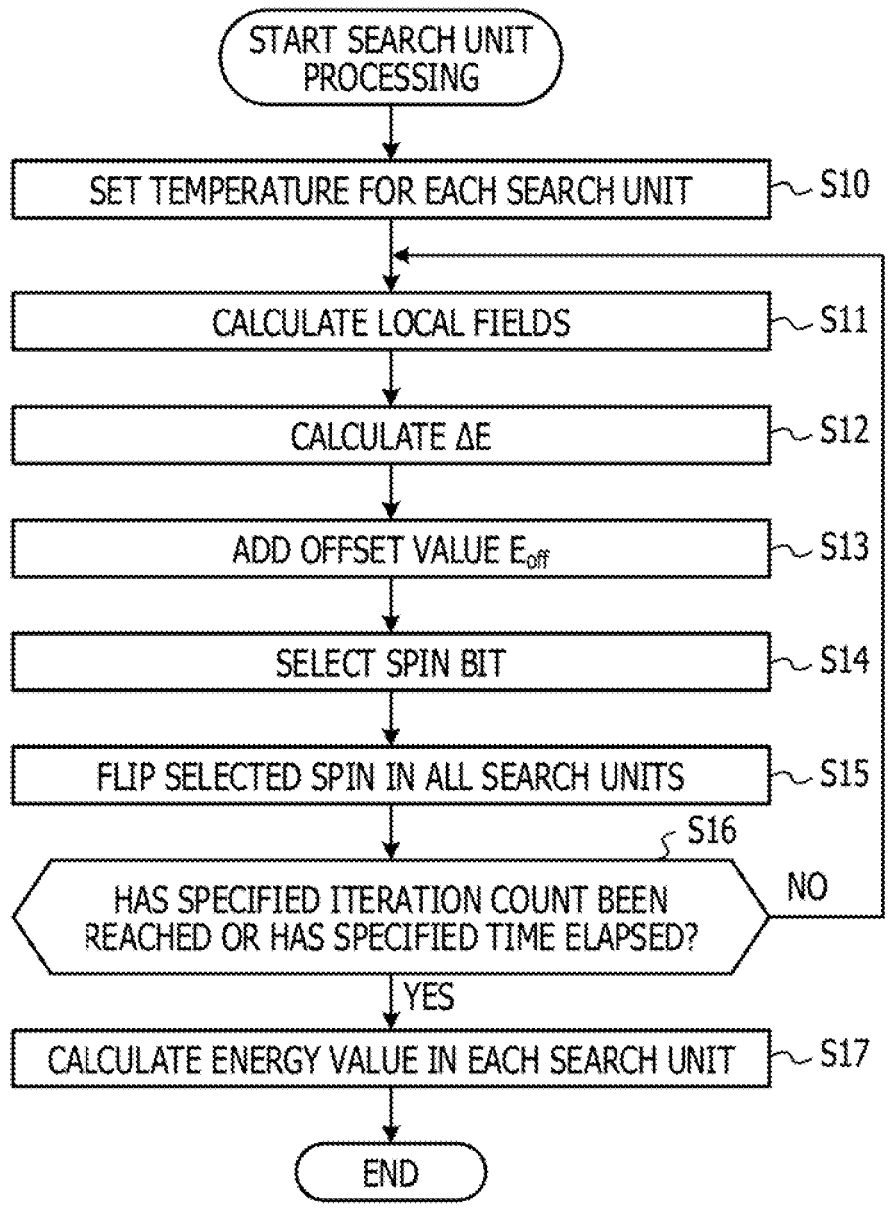

OPTIMIZATION DEVICE AND METHOD OF CONTROLLING OPTIMIZATION DEVICE UTILIZING A SPIN BIT

CROSS-REFERENCE TO RELATED APPLICATION

This application is based upon and claims the benefit of priority of the prior Japanese Patent Application No. 2019-90351, filed on May 13, 2019, the entire contents of which are incorporated herein by reference.

FIELD

The embodiments discussed herein are related to an optimization device and a method of controlling an optimization device.

BACKGROUND

In today's society, information processing is performed in all fields. The information processing is performed by arithmetic devices such as computers, which perform operations and processing on various data to obtain meaningful results to perform prediction, determination, control, etc. One of the information processing is optimization, which is an important field. Examples include problems of finding a solution to minimize resources and costs to do something and to maximize its effect, which are obviously very important.

Y. Sugita, Y. Okamoto, "Replica-exchange molecular dynamics method for protein folding", Chemical Physics Letters 314 (1999), pp. 141-151 is disclosed as related art.

Japanese Laid-open Patent Publication No. 9-231197 is disclosed as related art.

SUMMARY

According to an aspect of the embodiments, an optimization device includes: a memory; a processor coupled to the memory; and a plurality of search circuits configured to determine a plurality of energy values for a plurality of combinations of two state variables of a plurality of state variables, based on a plurality of weight values each indicating strength of connection between the two state variables, and values of the two state variables, determine values of the plurality of state variables, based on results of comparison between a plurality of evaluation values obtained by adding a noise value corresponding to a temperature to each of the plurality of energy values, and a threshold value, and be set to be equal to each other in connection states between the plurality of state variables based on the plurality of weight values, and be set to be different from each other in temperature, the processor is configured to: determine an exchange count, based on a difference between a temperature set for a search circuit corresponding to the lowest energy value of the plurality of energy values determined by the plurality of search circuits, and a minimum temperature that is the lowest temperature of temperatures set for the plurality of search circuits; and set a temperature for each of the plurality of search circuits, and exchange the set temperatures between the plurality of search circuits for the exchange count.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a flowchart illustrating a search unit processing example;

DESCRIPTION OF EMBODIMENTS

Figure 1:
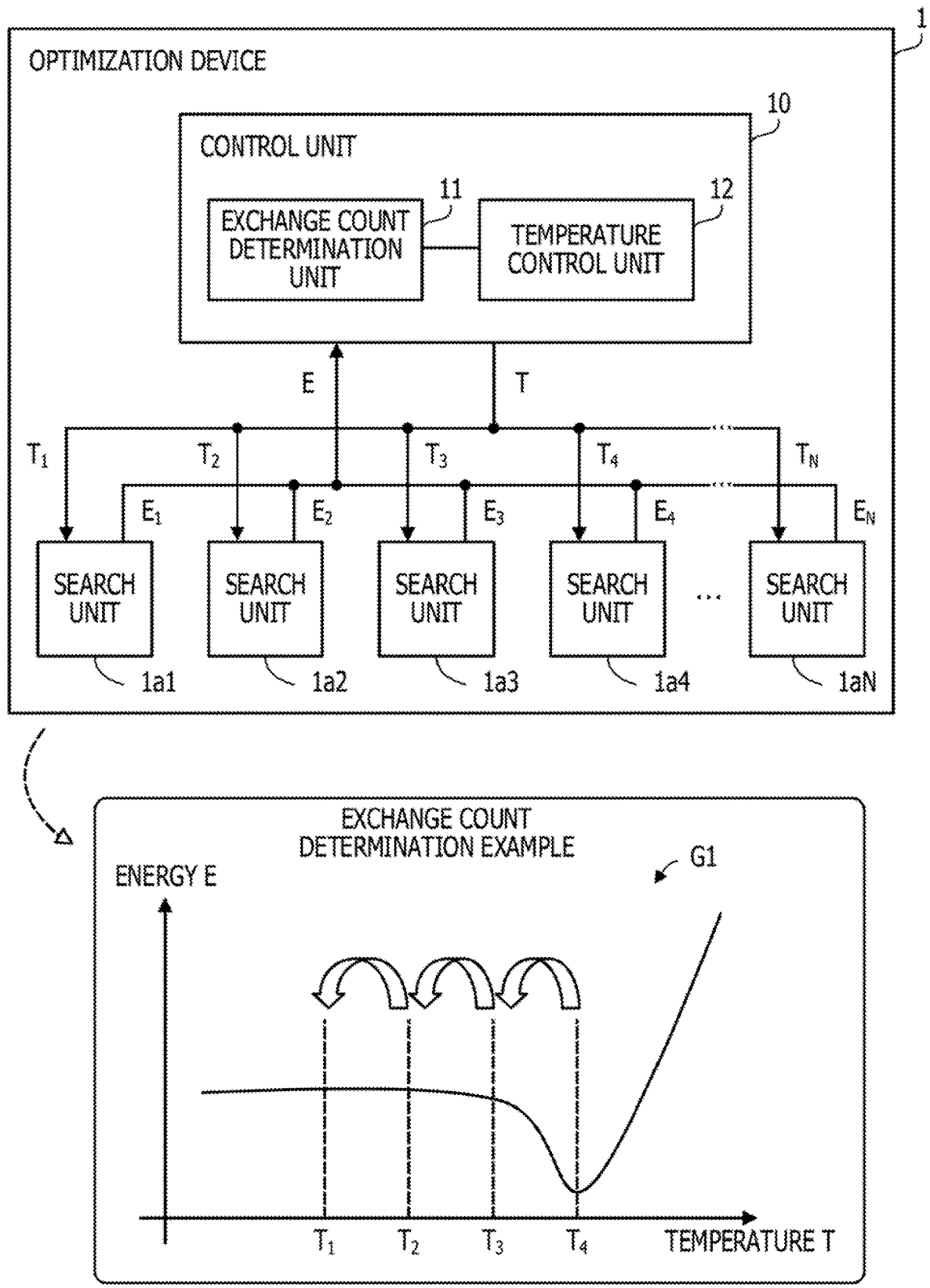
FIG. 1 is a diagram illustrating an optimization device according to a first embodiment.

It is known that among optimization problems, many problems called discrete optimization problems, combinatorial optimization problems, or the like are very difficult to solve because variables take discrete values, not continuous values. The biggest reason that makes it difficult to solve a discrete optimization problem is that there is a plurality of states called local solutions that are not optimum solutions but take minimum values in local neighborhoods.

There is no efficient general solution to solve a discrete optimization problem. Thus, it is significant to use an approximate solution using the nature intrinsic in the problem or a method called a metaheuristic that does not rely much on the nature of the problem.

The following description relates to a solution using a Markov chain Monte Carlo method of the latter, and, especially, for example, relates to simulated annealing in a broad sense called an exchange Monte Carlo method or a replica-exchange method.

Simulated annealing is a method of determining an optimum solution by probabilistically changing a state (the value of a variable vector) using a random number. The following describes a problem of minimizing the value of an evaluation function to be optimized as an example. The value of the evaluation function is referred to as energy. For maximization, the sign of the evaluation function may be changed.

It has been proved that in simulated annealing, by determining the acceptance (acceptable) probability of a state transition as follows using an energy change accompanying the transition and temperature, the state reaches an optimum solution in the limit of infinite time (iteration count).

[Equation 1]

$$p(\Delta E, T) = f\left(-\frac{\Delta E}{T}\right) \quad (1)$$

[Equation 2]

$$f_{metro}(x) = \min(1, e^x) \quad (2)$$

[Equation 3]

$$f_{Gibbs}(x) = \frac{1}{1 + e^{-x}} \quad (3)$$

Equation (2) is a Metropolis method. Equation (3) is a Gibbs method. One of equations (2) and (3) is used.

Here, T is a parameter representing a temperature. Its initial value needs to be made sufficiently large according to a problem, and to be reduced sufficiently slowly.

As described above, in simulated annealing, an optimum solution (a solution corresponding to the ground state) can be obtained by setting the iteration count to infinity. In reality, however, it is significant to obtain a solution with a finite iteration count, and thus an optimum solution may not be obtained with reliability. In addition, since the temperature decreases very slowly as described above, the temperature does not sufficiently decrease in a finite time. Therefore, in actual simulated annealing, the temperature is often reduced faster than when temperature is changed to ensure a theoretical convergence.

In actual simulated annealing, starting from an initial state, the above-described iteration is repeated while the temperature is reduced. When a completion determination condition such as reaching a certain iteration count or the energy falling below a certain value is satisfied, the operation is completed. An answer output is a state at the completion. However, since the temperature does not actually become zero at a finite iteration count, the occupancy probability of the state has a distribution represented by a Boltzmann distribution or the like even at the completion, and does not necessarily become an optimal value or a good solution. Thus, it is a practical solution to keep a state with the lowest energy obtained so far in the middle of iteration, and output it at the end.

As can be imagined somewhat from the above description, simulated annealing is versatile and very attractive, but has a problem that calculation time is relatively long due to the need to slowly reduce temperature. Further, there is another problem that it is difficult to properly adjust the way of reducing temperature according to a problem. If temperature is reduced too slowly, the temperature does not decrease much in a finite time, so that the energy range of a final heat distribution becomes wide and thus the occupation probability of a good solution is not increased. On the other hand, if temperature is reduced too fast, the temperature decreases before escape from a local solution, and the calculation remains stuck in a bad solution, so that the probability of obtaining a good solution decreases.

A replica-exchange method performs an operation to perform Monte Carlo searches (hereinafter referred to as "probabilistic searches") using a plurality of temperatures at the same time, compare the energies of their respective states every certain iteration count, and exchange states corresponding to two temperatures with an appropriate probability.

Figure 21:
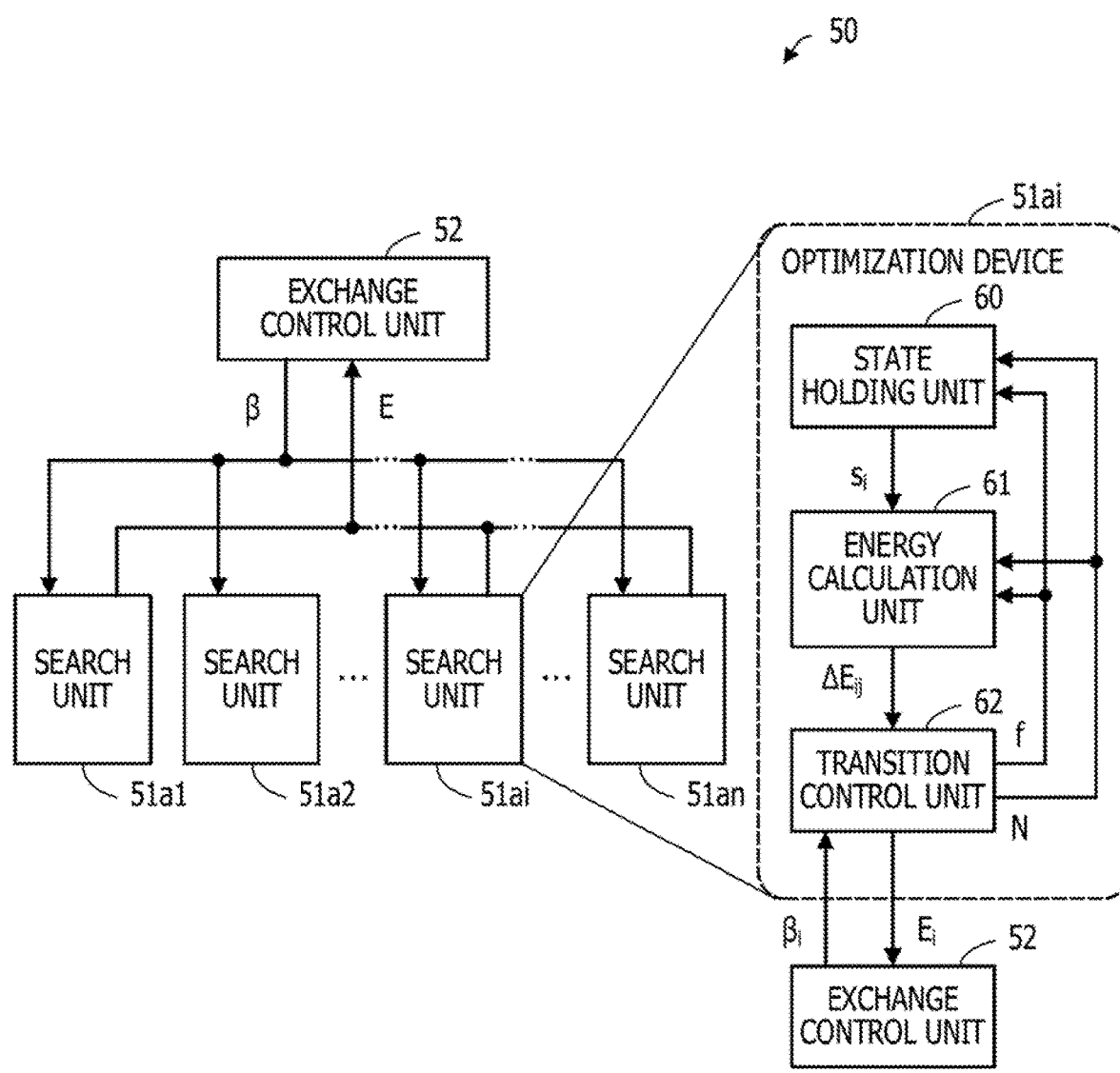
FIG. 21 is a diagram illustrating a configuration example of an optimization device using a normal replica-exchange method.

FIG. 21 is a diagram illustrating a configuration example of an optimization device using a normal replica-exchange method. Unlike an optimization device using a normal simulated annealing method, an optimization device 50 includes a plurality of replicas (search units 51a1, 51a2, ..., 51ai, ..., and 51an in FIG. 21) and an exchange control unit 52. The exchange control unit 52 provides temperature information (hereinafter, inverse temperatures $\beta_i$ (the inverses of T) ($1 \le i \le n$) are used) to the search units 51a1 to 51an.

FIG. 21 illustrates an example of the search unit 51ai. The other search units have the same configuration. The search unit 51ai includes a state holding unit 60, an energy calculation unit 61, and a transition control unit 62.

The state holding unit 60 holds the values of a plurality of state variables included in an evaluation function. Furthermore, the state holding unit 60 updates states s; that are the values of the plurality of state variables (the above-described values of variable vectors), based on a flag f indicating whether state transition is enabled or disabled, and the number (index) N of a state variable indicated by the flags f.

The energy calculation unit 61 calculates energy changes accompanying changes in the state variables (state transitions). For example, when the evaluation function is represented by the Ising model represented by a connection between two state variables, and only a transition of one state variable at a time is allowed, the energy calculation unit 61 calculates an energy change accompanying the change (state transition) of each of the plurality of state variables, based on the value of each state variable, a coupling coefficient indicating the strength of connection between the state variables, the number N, and the flag f. An energy change $\Delta E_{ij}$ indicates an energy change accompanying a change in the j-th state variable. Note that the value of the coupling coefficient suitable for an optimization problem to be calculated is stored in memory or a register in advance. When the evaluation function is not the Ising model, and when transitions of a plurality of state variables at a time are allowed, the numbers of state transitions and the numbers of changing state variables do not always match. However, it is only significant to properly calculate energy changes corresponding to the numbers of the state transitions. The energy calculation unit 61 can be implemented using, for example, a logic circuit such as a product-sum operation circuit.

The transition control unit 62 performs a probabilistic search by determining the acceptance probability of the state transition of the j-th state variable by equation (4) below, using the energy change $\Delta E_{ij}$ and the inverse temperature $\beta_i$ assigned by the exchange control unit 52, like a normal simulated annealing method.

[Equation 4]

$$p(\Delta E_{ij}, \beta_i) = f(-\beta_i \Delta E_{ij}) \quad (4)$$

Note that in equation (4), the function f is the same as that in equation (1). For example, the function of the Metropolis method in equation (2) is used. The transition control unit 62 outputs a flag f indicating whether a state transition is enabled or disabled, and the number of the state transition indicated by the flag f, based on the above-described acceptance probability of the state transition. Further, the transition control unit 62 updates and outputs an energy $E_i$, based on the energy change $\Delta E_{ij}$.

The exchange control unit 52 observes energies E in the search units every certain iteration count, and exchanges the values of the state variables in two of the search units 51a1 to 51an, based on an exchange probability expressed by equation (5) below, using the energies E and the inverse temperatures $\beta$ in the two search units. In place of the values of the state variables, the inverse temperatures provided to the two search units may be exchanged.

[Equation 5]

$$p_{ij} = f((\beta_i - \beta_j)(E_i - E_j)) \quad (5)$$

Note that in equation (5), $\beta_i$ is the inverse temperature provided to the search unit 51ai, $\beta_j$ is the inverse temperature provided to the j-th search unit (not illustrated), $E_i$ is the energy in the search unit 51ai, and $E_j$ is the energy in the j-th search unit. Furthermore, in equation (5), the function f is the same as that in equation (1). For example, the function f of the Metropolis method in equation (2) is used.

Even if this exchange is performed, the probability distribution of states at different temperatures converges to a Boltzmann distribution with respect to the temperatures. And the relaxation time to converge to this distribution can be made shorter than when no exchange is performed.

Note that for two search units for which an exchange is performed, those provided with temperatures close to each other (for example, those provided with adjacent temperatures) are selected so that the exchange probability does not become too small.

When the optimization device 50 implements the search units 51a1 to 51an that perform a large number of times of iterative processing by a dedicated circuit, and implements the function of the exchange control unit 52 by software, the values of the state variables (or temperature information) of two search units with temperatures close to each other may be exchanged by pointer passing. In this case, it is not significant to perform sort processing to arrange information identifying the search units 51a1 to 51an in ascending or descending temperature order at every exchange, or the like.

For example, there is a proposal of a replica-exchange method in which a Monte Carlo or molecular dynamics algorithm is simultaneously and independently executed in different replicas in a fixed-temperature canonical ensemble, and the states of replicas with adjacent temperatures are exchanged with a certain probability.

Further, there is a proposal of a constant-temperature bath device for temperature parallel simulated annealing that probabilistically exchanges a first state that is obtained by performing simulated annealing processing under a first temperature and a second state that is obtained by performing simulated annealing processing under a second temperature.

In optimization devices, the time to search for the ground state becomes a problem. In one aspect, an optimization device and a method of controlling an optimization device that speed up a search for the ground state may be provided.

Hereinafter, embodiments will be described with reference to the drawings.

First Embodiment

A first embodiment will be described.

FIG. 1 is a diagram illustrating an optimization device according to the first embodiment.

An optimization device 1 includes a plurality of search units (search units 1a1, 1a2, 1a3, 1a4, . . . , and 1aN) and a control unit 10. N is an integer of two or more, and corresponds to the number of search units. The optimization device 1 performs a search for the ground state by a replica-exchange method on an optimization problem. The optimization device 1 is implemented using, for example, a semiconductor integrated circuit such as a field-programmable gate array (FPGA).

The search units 1a1 to 1aN determine a plurality of energy values for a plurality of combinations of two state variables of a plurality of state variables, based on a plurality of weight values each indicating the strength of connection between the two state variables, and the values of the two state variables. Furthermore, the search units 1a1 to 1aN determine the values of the plurality of state variables, based on the results of comparison between a plurality of evaluation values obtained by adding a noise value corresponding to a temperature to each of the plurality of energy values and a threshold value. The search units 1a1 to 1aN are set to be equal to each other in connection states between the plurality of state variables based on the plurality of weight values, and different from each other in temperature.

For example, one search unit determines changes in the energy values corresponding to a change in the value of a certain state variable with respect to the values of the plurality of state variables, for a plurality of combinations of two state variables of the plurality of state variables, based on the plurality of weight values each indicating the strength of connection between the two state variables and the values of the two state variables. The search unit determines the values of the plurality of state variables by determining which state variable value change to accept, based on the results of comparison between the plurality of evaluation values obtained by adding the noise value corresponding to the temperature to each of the plurality of energy value changes, and the threshold value. The search unit obtains energy values corresponding to the determined values of the plurality of state variables, for example, by adding changes in the energy values to initial values of the energy values. Alternatively, the search unit may substitute the values of the plurality of state variables into a predetermined evaluation function to obtain energy values corresponding to the determined values of the plurality of state variables. The other search units perform the same processing as the search unit.

Here, the energies output by the search units 1a1 to 1aN are represented as $E_1$ to $E_N$. Furthermore, the temperatures set for the search units 1a1 to 1aN are represented as $T_1$ to $T_N$. N temperature values are different from each other. For example, the temperature values may be inverse temperatures $\beta_1, \beta_2, \ldots,$ and $\beta_N$, which are the inverses of the temperatures $T_1, T_2, \ldots,$ and $T_N$.

A minimum temperature tmp_min and a maximum temperature tmp_max of the temperatures $T_1, T_2, \ldots,$ and $T_N$ are given in advance. When the set temperatures are arranged in ascending order from the minimum temperature tmp_min, the i-th temperature tmp[i] (i is an integer of one or more) is represented, for example, by equation (6).

[Equation 6]

$$tmp[i] = tmp\_min \cdot \exp\left(\frac{i-1}{denom}\right) \quad (6)$$

Here, denom is represented, for example, by equation (7).

[Equation 7]

$$denom = \frac{N-1}{\log\left(\frac{tmp\_max}{tmp\_min}\right)} \quad (7)$$

The search units $1a1$ to $1aN$ operate in parallel to search for the ground state. The temperatures set for the search units $1a1$ to $1aN$ are controlled by the control unit 10.

The control unit 10 controls searches for the ground state by the search units $1a1$ to $1aN$. The control unit 10 includes an exchange count determination unit 11 and a temperature control unit 12.

The exchange count determination unit 11 determines an exchange count, based on the difference between the temperature set for a search unit corresponding to the lowest energy value of the plurality of energy values determined by the search units $1a1$ to $1aN$, and the minimum temperature that is the lowest temperature of the temperatures set for the search units $1a1$ to $1aN$.

The temperature control unit 12 sets a temperature for each of the search units $1a1$ to $1aN$, and exchanges the set temperatures between the search units $1a1$ to $1aN$ for the exchange count determined by the exchange count determination unit 11. For example, the temperature control unit 12 exchanges the temperatures or the states between each pair of two search units with adjacent temperatures in a predetermined exchange cycle (e.g., after reaching a certain number of times of update processing on one state variable or the elapse of a certain period of time), based on the exchange probability in equation (5). Here, in the "exchange" processing, temperatures or states are exchanged between some pairs according to the exchange probability of equation (5), and temperatures or states are not exchanged between others according to the exchange probability of equation (5).

The exchange probability decreases as the temperature difference increases. Thus, for example, the temperature control unit 12 focuses on an even-numbered (or odd-numbered) search unit when the search units are arranged in ascending temperature order, and exchanges temperatures between the search unit and a search unit with an adjacent temperature. Alternatively, one temperature exchange may include a plurality of sub-processing. For example, the temperature control unit 12 first performs first sub-processing to focus on an even-numbered (or odd-numbered) search unit when the search units are arranged in ascending temperature order, and exchange temperatures between the search unit and a search unit with an adjacent temperature. Next, the temperature control unit 12 performs second sub-processing to focus on an odd-numbered (or even-numbered) search unit when the search units are arranged in ascending temperature order, and exchange temperatures between the search unit and a search unit with an adjacent temperature. In this case, a set of the first sub-processing and the second sub-processing corresponds to one temperature exchange. However, the exchange method described as an example here is an example, and the temperature control unit 12 may exchange temperatures by another method.

Here, an example of exchange count determination by the exchange count determination unit 11 will be described.

For example, for the temperatures $T_1$ to $T_N$ set for the search units $1a1$ to $1aN$, assume that $T_1 < T_2 < T_3 < T_4 < \ldots < T_N$ at an exchange timing according to the exchange cycle. Also, assume that the energy value output by the search unit $1a4$ is the lowest of the energy values output by the search units $1a1$ to $1aN$ at the exchange timing. A graph G1 in FIG. 1 illustrates energy values output by search units for which different temperatures are set. The horizontal axis in the graph G1 is temperature T, and the vertical axis is energy E. In this case, the temperature set for the search unit $1a4$ corresponding to the lowest energy value is $T_4$. Furthermore, the lowest temperature of the temperatures set for the search units $1a1$ to $1aN$ is $T_1$.

Thus, the exchange count determination unit 11 determines the exchange count, based on the difference between the temperature $T_4$ and the temperature $T_1$. For example, when a search unit having the lowest energy is counted to cnt in the temperature order from a search unit with the minimum temperature, the exchange count determination unit 11 sets, as the exchange count, a value obtained by multiplying cnt by an adjustment factor $\alpha$ ($0 < \alpha \leq 1$) and rounding the result to an integer. The exchange count determination unit 11 may obtain the exchange count by the calculation of the exchange count=max(cnt×$\alpha$, 1). Here, the max function indicates that the maximum value of the arguments is taken. The adjustment factor $\alpha$ is given in advance to the exchange count determination unit 11.

In the above example, the search unit having the lowest energy is the search unit $1a4$. Furthermore, the search unit with the minimum temperature is the search unit $1a1$. The search units $1a1$ to $1aN$ arranged in ascending temperature order are the search units $1a1, 1a2, 1a3, 1a4, \ldots,$ and $1aN$. In the above example on the search units $1a1$ and $1a4$, cnt=3. As an example, letting $\alpha$=1, the exchange count determination unit 11 sets the exchange count to three. In this case, the temperature control unit 12 performs exchange of the temperatures three times at this exchange timing.

According to the optimization device 1, the exchange count determination unit 11 determines the exchange count, based on the difference between the temperature set for a search unit corresponding to the lowest energy value of the energy values output by the search units $1a1$ to $1aN$, and the minimum temperature that is the lowest temperature of the temperatures set for the plurality of search units. The temperature control unit 12 sets a temperature for each of the search units $1a1$ to $1aN$, and exchanges the set temperatures between the search units $1a1$ to $1aN$ for the determined exchange count.

This allows a search for the ground state to be speeded up.

For a search unit corresponding to the lowest energy of the search units $1a1$ to $1aN$, it is highly probable that a better solution (a state with a lower energy) exists in the neighborhood of the state held by the search unit. Therefore, by determining the exchange count based on the difference between the temperature of a search unit corresponding to the lowest energy and the minimum temperature, the optimization device 1 can quickly shift the search unit having the lowest energy to the lower-temperature side. Then, in the search unit corresponding to the lowest energy, a search with a state transition with a relatively small energy change is promoted (a state transition with a relatively large energy change is limited), increasing the possibility of reaching a better solution. Thus, the time taken by the search units $1a1$ to $1aN$ to search for the ground state can be shortened to speed up reaching the lowest energy.

Second Embodiment

Next, a second embodiment will be described.

Figure 2:
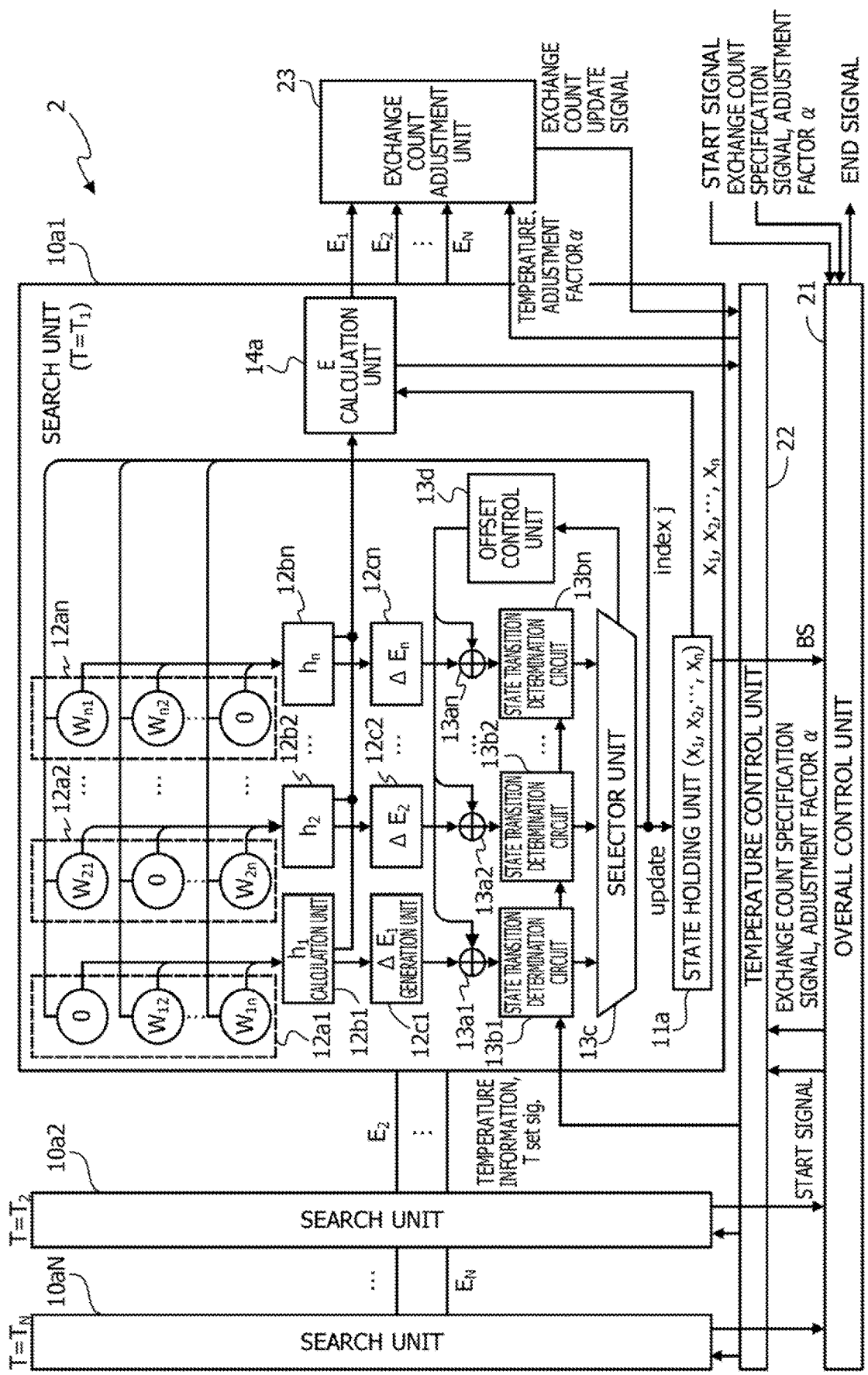
FIG. 2 is a diagram illustrating a circuit configuration example of an optimization device according to a second embodiment.

FIG. 2 is a diagram illustrating a circuit configuration example of an optimization device according to the second embodiment.

An optimization device 2 searches combinations (states) of the values of a plurality of spin bits corresponding to a plurality of spins included in the Ising model into which an optimization problem to be calculated is transformed, for the value of each spin bit when an evaluation function becomes a minimum value (ground state).

An Ising-type evaluation function E(x) is defined, for example, by equation (8) below.

[Equation 8]
$$E(x) = -\sum_{\langle i,j \rangle} W_{ij} x_i x_j - \sum_i b_i x_i \quad (8)$$

The first term on the right side is the summation of the products of the values (0 or 1) of two spin bits that can be selected from all spin bits included in the Ising model and a coupling coefficient for all combinations of two spin bits without omission and repetition. The total number of spin bits included in the Ising mode is n (n is an integer of two or more). In one example, n=1024. Furthermore, each of i and j is an integer of one or more and n or less. $x_i$ is a variable (also referred to as a state variable) representing the value of the i-th spin bit. $x_j$ is a variable representing the value of the j-th spin bit. $W_{ij}$ is a weighting factor indicating the magnitude of the interaction between the i-th and j-th bits. Note that $W_{ii}=0$. Furthermore, in many cases, $W_{ij}=W_{ji}$ (in other words, for example, a coefficient matrix based on weighting factors is often a symmetric matrix).

The second term on the right side is the sum of the products of bias factors of all the spin bits and the values of the spin bits. $b_i$ represents the bias factor of the i-th spin bit.

Furthermore, when the value of the variable $x_i$ changes to $1-x_i$, the increment of the variable $x_i$ can be expressed as $\delta x_i = (1-x_i) - x_i = 1 - 2x_i$. Thus, an energy change $\Delta E_i$ accompanying a spin flip (a change in value) is expressed by equation (9) below.

[Equation 9]
$$\begin{aligned}\Delta E_i &= E(x)|_{x_i \to 1-x_i} - E(x) \\ &= -\delta x_i \left( \sum_j W_{ij} x_j + b_i \right) \\ &= -\delta x_i h_i \\ &= \begin{cases} -h_i & \text{(for } x_i = 0 \to 1) \\ +h_i & \text{(for } x_i = 1 \to 0) \end{cases}\end{aligned} \quad (9)$$

$h_i$ is called a local field and is expressed by equation (10).

[Equation 10]
$$h_i = \sum_j W_{ij} x_j + b_i \quad (10)$$

The local field $h_i$ multiplied by a sign (+1 or −1) depending on $\delta x_i$ is the energy change $\Delta E_i$. A change $\delta h_i^{(j)}$ of the local field $h_i$ when a certain variable $x_j$ changes is expressed by Equation (11).

[Equation 11]
$$\delta h_i^{(j)} = \begin{cases} +W_{ij} & \text{(for } x_j = 0 \to 1) \\ -W_{ij} & \text{(for } x_j = 1 \to 0) \end{cases} \quad (11)$$

Processing to update the local field $h_i$ when a certain variable $x_j$ changes is performed in parallel on each variable.

The optimization device 2 is implemented using, for example, a semiconductor integrated circuit such as an FPGA. The optimization device 2 includes search units $10a1$ to $10aN$, an overall control unit 21, a temperature control unit 22, and an exchange count adjustment unit 23.

The search units $10a1$ to $10aN$ correspond to the search units $1a1$ to $1aN$ of the first embodiment. The exchange count adjustment unit 23 corresponds to the exchange count determination unit 11 of the first embodiment. The temperature control unit 22 corresponds to the temperature control unit 12 of the first embodiment.

Different temperatures $T_1$ to $T_N$ are set for the search units $10a1$ to $10aN$. The temperatures $T_1$ to $T_N$ are determined based on, for example, Equations (6) and (7) using a minimum temperature tmp_min and a maximum temperature tmp_max that are given in advance. Each of the search units $10a1$ to $10aN$ implements a search for the ground state based on the Ising-type evaluation function represented by Equation (8), using a circuit as described below. The following mainly describes the search unit $10a1$. The search units $10a2$ to $10aN$ have the same circuit configuration.

The search unit $10a1$ includes a state holding unit $11a$, registers $12a1, 12a2, \ldots,$ and $12an$, h calculation units $12b1, 12b2, \ldots,$ and $12bn$, $\Delta E$ generation units $12c1, 12c2, \ldots,$ and $12cn$, adders $13a1, 13a2, \ldots,$ and $13an$, state transition determination circuits $13b1, 13b2, \ldots,$ and $13bn$, a selector unit $13c$, an offset control unit $13d$, and an E calculation unit $14a$.

In FIG. 2, the h calculation units $12b1$ to $12bn$ are denoted with a subscript i added to their names like an "h" calculation unit to make it clearer that it corresponds to the i-th spin bit. Furthermore, in FIG. 2, the $\Delta E$ generation units $12c1$ to $12cn$ are denoted with a subscript i added to their names like an "$\Delta E_i$" calculation unit to make it clearer that it corresponds to the i-th spin bit.

When a certain search unit determines whether to flip one of the spin bits included in a spin bit string and flips it, processing to flip the spin bit corresponds to processing of one ground state search (sometimes referred to as a probabilistic search) performed by the search unit. The processing of one search is repeatedly executed. The number of repetitions of the processing of one search executed in parallel by the search units $10a1$ to $10aN$ is referred to as an iteration count.

Of the n spin bits, the register $12a1$, the h calculation unit $12b1$, the $\Delta E$ generation unit $12c1$, the adder $13a1$, and the state transition determination circuit $13b1$ perform operations on the first spin bit. Furthermore, the register $12a2$, the h calculation unit $12b2$, the $\Delta E$ generation unit $12c2$, the adder $13a2$, and the state transition determination circuit $13b2$ perform operations on the second spin bit. Likewise, a numerical value i at the end of numerical references such as "$12a1$" and "$12b1$" indicates that operations corresponding to the i-th spin bit are performed. In other words, for example, one search unit includes n sets of a register, an h calculation unit, a $\Delta E$ generation unit, an adder, and a state transition determination circuit (a unit of an operation processing circuit that performs operations on one spin bit, and sometimes called a "neuron"). The n sets perform operations on the spin bits corresponding one-to-one to the sets in parallel.

The following mainly describes the register $12a1$, the h calculation unit $12b1$, the $\Delta E$ generation unit $12c1$, the adder $13a1$, and the state transition determination circuit $13b1$ as an example. The registers $12a2$ to $12an$, the h calculation units $12b2$ to $12bn$, the $\Delta E$ generation units $12c2$ to $12cn$, the adders $13a2$ to $13an$, and the state transition determination circuits $13b2$ to $13bn$ with the same names have the same functions.

Here, the spin bit corresponding to the set of the register $12a1$, the h calculation unit $12b1$, the $\Delta E$ generation unit $12c1$, the adder $13a1$, and the state transition determination circuit $13b1$ is referred to as the own spin bit, and the spin bits other than that calculated in the search unit $10a1$ are referred to as the other spin bits. Each spin bit is identified by identification information called an index. For example, the index of the i-th spin bit is i.

The state holding unit $11a$ holds states (bit states) in the search unit $10a1$. The bit states are represented by a plurality of state variables (state variables $x_1$, $x_2$, ..., and $x_n$). The bit states are a spin bit string including the n spin bits in the search unit $10a1$. In the figures, the bit states are sometimes abbreviated as BS.

The register $12a1$ is a storage unit that stores weighting factors $W_{1j}$ (j=1 to n) between the own spin bit and the other spin bits. Here, for the number of spin bits n, the total number of weighting factors is $n^2$. The register $12a1$ stores n weighting factors. Furthermore, the subscript i of the weighting factors $W_{ij}$ indicates the index of the own spin bit, and the subscript j of the weighting factors $W_{ij}$ indicates the index of any spin bit including the own spin bit.

The register $12a1$ stores n weighting factors $W_{11}$, $W_{12}$, ..., and $W_{1n}$ for the own spin bit. Note that $W_{ii}=W_{11}=0$. The register $12a1$ outputs the weighting factor $W_{1j}$ corresponding to index=j provided by the selector unit $13c$ to the h calculation unit $12b1$.

The h calculation unit $12b1$ calculates a local field $h_1$ based on Equations (10) and (11), using the weighting factor $W_{1j}$ provided from the register $12a1$. For example, the h calculation unit $12b1$ has a register for holding the local field $h_1$ calculated last time, and adds $\delta h_1^{(j)}$ depending on the flip direction of the spin bit indicated by index=j to $h_1$ to update $h_1$ stored in the register. A signal indicating the flip direction of the spin bit indicated by index=j may be provided from the selector unit $13c$ or the state holding unit $11a$ to the h calculation unit $12b1$. The initial value of h is preset in the register of the h calculation unit $12b1$, according to a problem. Furthermore, the value of $b_1$ is preset in the register of the h calculation unit $12b1$, according to the problem. The h calculation unit $12b1$ outputs the calculated local field $h_1$ to the $\Delta E$ generation unit $12c1$ and the E calculation unit $14a$.

The $\Delta E$ generation unit $12c1$ generates an energy change value $\Delta E_1$ of the Ising model according to the flip of the own spin bit based on Equation (9), using the local field $h_1$. The $\Delta E$ generation unit $12c1$ may determine the flip direction of the own spin bit from, for example, the current value of the own spin bit provided from the state holding unit $11a$ (if the current value is 0, 0 to 1 is the flip direction, and if the current value is 1, from 1 to 0 is the flip direction). The $\Delta E$ generation unit $12c1$ outputs the generated energy change value $\Delta E_1$ to the adder $13a1$. Here, depending on addition processing in the adder $13a1$ and determination processing in the state transition determination circuit $13b1$ in subsequent stages, the $\Delta E$ generation unit $12c1$ may output an energy change value $-\Delta E_1$ obtained by reversing the sign of the energy change value $\Delta E_1$ to the adder $13a1$. In this example, assume that the $\Delta E$ generation unit $12c1$ outputs $-\Delta E_1$ to the adder $13a1$ as the energy change value.

The adder $13a1$ adds $-\Delta E_1$ provided from the $\Delta E$ generation unit $12c1$ and an offset value $E_{off}$ provided from the offset control unit $13d$. The offset value $E_{off}$ is a parameter for prompting a state transition as described later, and is controlled by the offset control unit $13d$. In this example, $E_{off} \geq 0$. The initial value of $E_{off}$ is zero. $E_{off}$ is gradually increased by the offset control unit $13d$ described later. The adder $13a1$ outputs the addition result $(-\Delta E_1+E_{off})$ to the state transition determination circuit $13b1$.

The state transition determination circuit $13b1$ outputs a flag $f_l$ indicating whether the flip of the own spin bit is enabled or disabled to the selector unit $13c$, according to the sum $(-\Delta E_1+E_{off})$ of the energy change value and the offset value $E_{off}$ provided from the adder $13a1$. Specifically, for example, the state transition determination circuit $13b1$ determines whether to enable or disable the flip of the own spin bit, based on a comparison between $-\Delta E_1+E_{off}$ and thermal noise corresponding to the temperature.

Here, the determination by the state transition determination circuit $13b1$ will be described.

In simulated annealing, the acceptance probability $p(\Delta E, T)$ of a state transition that causes a certain energy change $\Delta E$ is determined as in Equation (1) described above. In Equation (1), T is a temperature. The temperature T is set for the state transition determination circuit $13b1$ by the temperature control unit $22$. Furthermore, as the function f, Equation (2) (the Metropolis method) or Equation (3) (the Gibbs method) is used.

For example, a circuit that outputs a flag (flg=1) indicating the acceptance of a state transition that causes an energy change $\Delta E$ with the acceptance probability $p(\Delta E, T)$ can be implemented by a comparator that outputs a value according to a comparison between $f(-\Delta E/T)$ and a uniform random number u taking a value in an interval [0, 1).

However, the same function can be implemented even if the following modification is made. Applying the same monotonically increasing function to two numbers does not change the magnitude relationship. Therefore, even if the same monotonically increasing function is applied to the two inputs of the comparator, the output of the comparator does not change. For example, the inverse function $f^{-1}(-\Delta E/T)$ of $f(-\Delta E/T)$ can be used as a monotonically increasing function applied to $f(-\Delta E/T)$, and $f^{-1}(u)$ in which $-\Delta E/T$ of $f^{-1}(-\Delta E/T)$ is u as a monotonically increasing function applied to the uniform random number u. In that case, a circuit having the same function as the above-described comparator may be a circuit that outputs 1 when $-\Delta E/T$ is greater than $f^{-1}(u)$. Moreover, since the temperature parameter T is positive, the state transition determination circuit $13b1$ may be a circuit that outputs flg=1 when $-\Delta E$ is greater than or equal to $T \cdot f^{-1}(u)$ (or when $\Delta E$ is smaller than or equal to $-(T \cdot f^{-1}(u))$).

The state transition determination circuit $13b1$ generates the uniform random number u, and generates the value of $f^{-1}(u)$, using a conversion table for conversion to the value of $f^{-1}(u)$ described above. When the Metropolis method is applied, $f^{-1}(u)$ is given by Equation (12). Furthermore, when the Gibbs method is applied, $f^{-1}(u)$ is given by Equation (13).

[Equation 12]

$$f_{metro}^{-1}(u) = \ln(u) \qquad (12)$$

[Equation 13]

$$f_{Gibbs}^{-1}(u) = \ln\left(\frac{u}{1-u}\right) \qquad (13)$$

The conversion table is stored, for example, in a register included in the state transition determination circuit 13b1. The state transition determination circuit 13b1 generates the product $(T \cdot f^{-1}(u))$ of the temperature parameter T and $f^{-1}(u)$, and compares the product with $-\Delta E_1 + E_{\textit{off}}$. Here, $T \cdot f^{-1}(u)$ corresponds to thermal noise. If $(-\Delta E_1 + E_{\textit{off}}) \geq T \cdot f^{-1}(u)$, the state transition determination circuit 13b1 outputs the flag $f_1 = 1$ (transition enabled) to the selector unit 13c. If $(-\Delta E_1 + E_{\textit{off}}) < T \cdot f^{-1}(u)$, the state transition determination circuit 13b1 outputs the flag $f_1 = 0$ (transition disabled) to the selector unit 13c.

The state transition determination circuit 13b1 may transform $(-\Delta E_1 + E_{\textit{off}}) \geq T \cdot f^{-1}(u)$, and output a flag indicating whether the transition is enabled or disabled, according to a comparison between an evaluation value obtained by adding a noise value $T \cdot f^{-1}(u)$ corresponding to the temperature to $(\Delta E_1 - E_{\textit{off}})$ and a threshold value (e.g., zero).

The selector unit 13c receives a flag indicating whether the transition is enabled or disabled output from each of the state transition determination circuits 13b1 to 13bn. When there are flags indicating that the transition is enabled among the flags output from the state transition determination circuits 13b1 to 13bn, the selector unit 13c selects one of the flags indicating that the transition is enabled. When there are no flags indicating that the transition is enabled among the flags output from the state transition determination circuits 13b1 to 13bn, the selector unit 13c selects one predetermined flag.

The selector unit 13c outputs to the state holding unit 11a an update signal (update) including the flag indicating whether the transition is enabled or disabled and the index=j indicating the spin bit corresponding to the selected flag. At the same time, the selector unit 13c outputs the selected flag indicating whether the transition is enabled or disabled to the offset control unit 13d, and outputs the index=j corresponding to the selected flag to each of the registers 12a1 to 12an.

The offset control unit 13d controls the offset value to be provided to each of the adders 13a1 to 13an, based on the flag indicating whether the transition is enabled or disabled output from the selector unit 13c. Specifically, for example, if the flag output from the selector unit 13c indicates that the transition is enabled, the offset control unit 13d resets the offset value to zero. If the flag output from the selector unit 13c indicates that the transition is disabled, the offset control unit 13d adds an incremental value $\Delta E_{\textit{off}}$ to the offset value. If the flag continuously indicates that the transition is disabled, the offset control unit 13d increases $E_{\textit{off}}$ by $\Delta E_{\textit{off}}$ by adding $\Delta E_{\textit{off}}$.

If the flag output from the selector unit 13c indicates that the transition is disabled, it is considered that the current state is stuck in a local solution. The addition of the offset value to $-\Delta E_1$ or the gradual increase of the offset value to be added allows a state transition to be accepted more easily. If the current state is in a local solution, escape from the local solution is promoted.

The state holding unit 11a updates the bit states $(x_1, x_2, \ldots, x_n)$ held by the register of the state holding unit 11a, based on the flag and the index output from the selector unit 13c. The state holding unit 11a outputs the current bit states to the E calculation unit 14a. The state holding unit 11a outputs the bit states at the time of completion of the search processing in the search unit 10a1 to the overall control unit 21.

The E calculation unit 14a calculates a current energy value $E_1$ of the Ising model in the search unit 10a1, based on the local fields $h_1$ to $h_n$ output from the h calculation units 12b1 to 12bn and the bit states $(x_1$ to $x_n)$ output from the state holding unit 11a. The energy value $E_1$ is an energy value (sometimes simply referred to as an energy) defined by the evaluation function of Equation (8). The E calculation unit 14a calculates the energy value $E_1$ in the search unit 10a1 by the sum of products of the local fields $h_i$ and the bit states $x_i$. When the search unit 10a1 has completed the search processing for a predetermined number of times or a predetermined period of time, the E calculation unit 14a outputs the calculated energy value $E_1$ to the temperature control unit 22 and the exchange count adjustment unit 23.

The overall control unit 21 controls the overall operation of the optimization device 2. The overall control unit 21 receives the external input of an exchange count specification signal indicating the initial value of a temperature exchange count, and an adjustment factor $\alpha$ ($0 < \alpha \leq 1$). The adjustment factor $\alpha$ is a parameter used for exchange count adjustment by the exchange count adjustment unit 23. The overall control unit 21 provides the exchange count specification signal and the adjustment factor $\alpha$ to the temperature control unit 22.

When receiving the input of a start signal, the overall control unit 21 outputs the start signal to the temperature control unit 22, and activates the search units 10a8 to 10aN to cause them to start the operation of a ground state search on an optimization problem. When the operation is completed, the overall control unit 21 acquires bit states from each of the search units 10a1 to 10aN to obtain a solution to the optimization problem. The overall control unit 21 outputs an end signal indicating the completion of the operation to the outside. The end signal may include information indicating the solution obtained by the operation. For example, the overall control unit 21 may output image information indicating the solution to a display device connected to the optimization device 2, and cause the display device to display the image information indicating the solution, thereby presenting the content of the obtained solution to a user.

The temperature control unit 22 controls the temperature provided to each of the search units 10a to 10aN. The temperature control unit 22 provides temperature information indicating the temperature and a temperature setting signal (T set sig.) to the state transition determination circuits included in each of the search units 10a1 to 10aN.

Furthermore, the temperature control unit 22 controls the exchange of temperatures (temperature exchange) in the search units 10a1 to 10aN. The temperature control unit 22 determines whether to perform a temperature exchange (e.g., for example, a replica exchange) for a pair of search units (a set of two search units) with adjacent temperatures, based on the exchange probability of Equation (5), on a pair-by-pair basis. The temperature control unit 22 provides the exchanged temperature to each search unit. The initial value of the temperature exchange count with the exchange timing is provided by the overall control unit 21. Furthermore, the temperature exchange count with the exchange timing is updated by the exchange count adjustment unit 23.

For example, the temperature control unit 22 holds in a register included in the temperature control unit 22 first correspondence information in which temperature identification information (referred to as temperature indices or temperature numbers) are associated with temperatures. For example, temperature indexes are associated with temperatures in ascending temperature order (the larger the temperature index, the higher the temperature). Moreover, the temperature control unit 22 holds in the register included in the temperature control unit 22 second correspondence information in which the temperature indexes arranged in ascending order, for example, are associated with the identification numbers of the search units 10a1 to 10aN. In this case, a pair of search units corresponding to adjacent temperature indexes in the second correspondence information have adjacent set temperatures. The temperature control unit 22 controls temperature exchanges for the search units 10a1 to 10aN, based on the first correspondence information and the second correspondence information, and updates the second correspondence information according to the exchanges. The temperature control unit 22 provides a temperature to each search unit, based on the first correspondence information and the second correspondence information.

However, the temperature control unit 22 may hold correspondence information in which the identification numbers of the search units 10a1 to 10aN are associated with temperature values, and sort the correspondence information by the temperature values to identify a pair of search units with adjacent set temperatures.

The exchange count adjustment unit 23 adjusts the count of temperature exchanges by the temperature control unit 22 in a predetermined replica exchange cycle. The exchange count adjustment unit 23 determines the temperature exchange count, based on the energies $E_i$ (i=1 to N) provided from the search units 10a1 to 10aN and the temperatures of the search units 10a1 to 10aN provided from the temperature control unit 22 at the exchange timing based on the replica exchange cycle. Specifically, for example, the exchange count adjustment unit 23 determines the temperature exchange count, based on the difference between the temperature of a search unit having the lowest energy and the minimum temperature of the temperatures $T_1$ to $T_N$, and the adjustment factor $\alpha$. The exchange count adjustment unit 23 outputs an exchange count update signal indicating the determined exchange count to the temperature control unit 22.

Next, a circuit configuration of the state transition determination circuits 13b1 to 13bn will be described. Hereinafter, the state transition determination circuit 13b1 will be described as an example. The other state transition determination circuits have the same circuit configuration.

Figure 3:
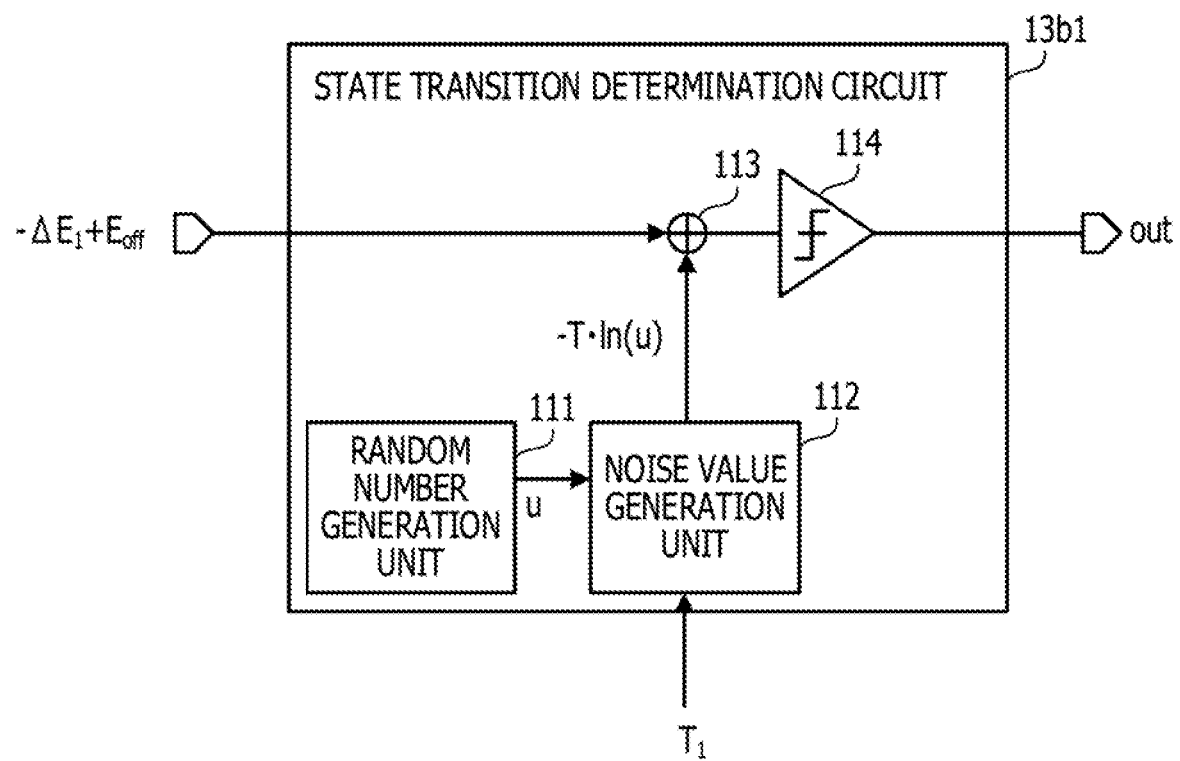
FIG. 3 is a diagram illustrating a circuit configuration example of a state transition determination circuit.

FIG. 3 is a diagram illustrating a circuit configuration example of the state transition determination circuit.

The state transition determination circuit 13b1 includes a random number generation unit 111, a noise value generation unit 112, an adder 113, and a comparator 114.

The random number generation unit 111 generates the uniform random number u and outputs it to the noise value generation unit 112.

The noise value generation unit 112 generates the value of $-T \cdot f^{-1}(u)$ corresponding to the noise value (thermal noise) based on Equation (12) (or Equation (13)) with the conversion table described above, using the uniform random number u and the temperature information indicating the temperature $T_1$ provided by the temperature control unit 22. The noise value generation unit 112 outputs the generated value of $-T \cdot f^{-1}(u)$ to the adder 113. For example, when Equation (12) is used, the noise value generation unit 112 generates $-T \cdot \ln(u)$ and outputs it to the adder 113.

The adder 113 calculates an evaluation value by adding $(-\Delta E_1 + E_{off})$ output from the adder 13a1 and $-T \cdot \ln(u)$, and outputs the evaluation value to the comparator 114.

The comparator 114 compares the evaluation value output by the adder 113 with a threshold value (specifically, e.g., zero). If the evaluation value is zero or more (if $(-\Delta E_1 + E_{off}) \geq T \cdot \ln(u) \geq 0$), the comparator 114 outputs a flag indicating that the transition is enabled (out=$f_1$=1) to the selector unit 13c. If the evaluation value is less than zero (if $(-\Delta E_1 + E_{off}) - T \cdot \ln(u) < 0$), the comparator 114 outputs a flag indicating that the transition is disabled (out=$f_1$=0) to the selector unit 13c. Note that the above determination is the same as determining that the transition is enabled if a determination formula of $(\Delta E_1 - E_{off}) + T \cdot \ln(u) \leq 0$ is true, and the transition is disabled if the determination formula is false. In other words, for example, the state transition determination circuit 13b1 may output a flag indicating whether the transition is enabled or disabled, according to a comparison between an evaluation value obtained by adding the noise value $T \cdot \ln(u)$ corresponding to the temperature to $(\Delta E_1 - E_{off})$ and a threshold value (=0).

Next, a circuit configuration example of the selector unit 13c will be described.

Figure 4:
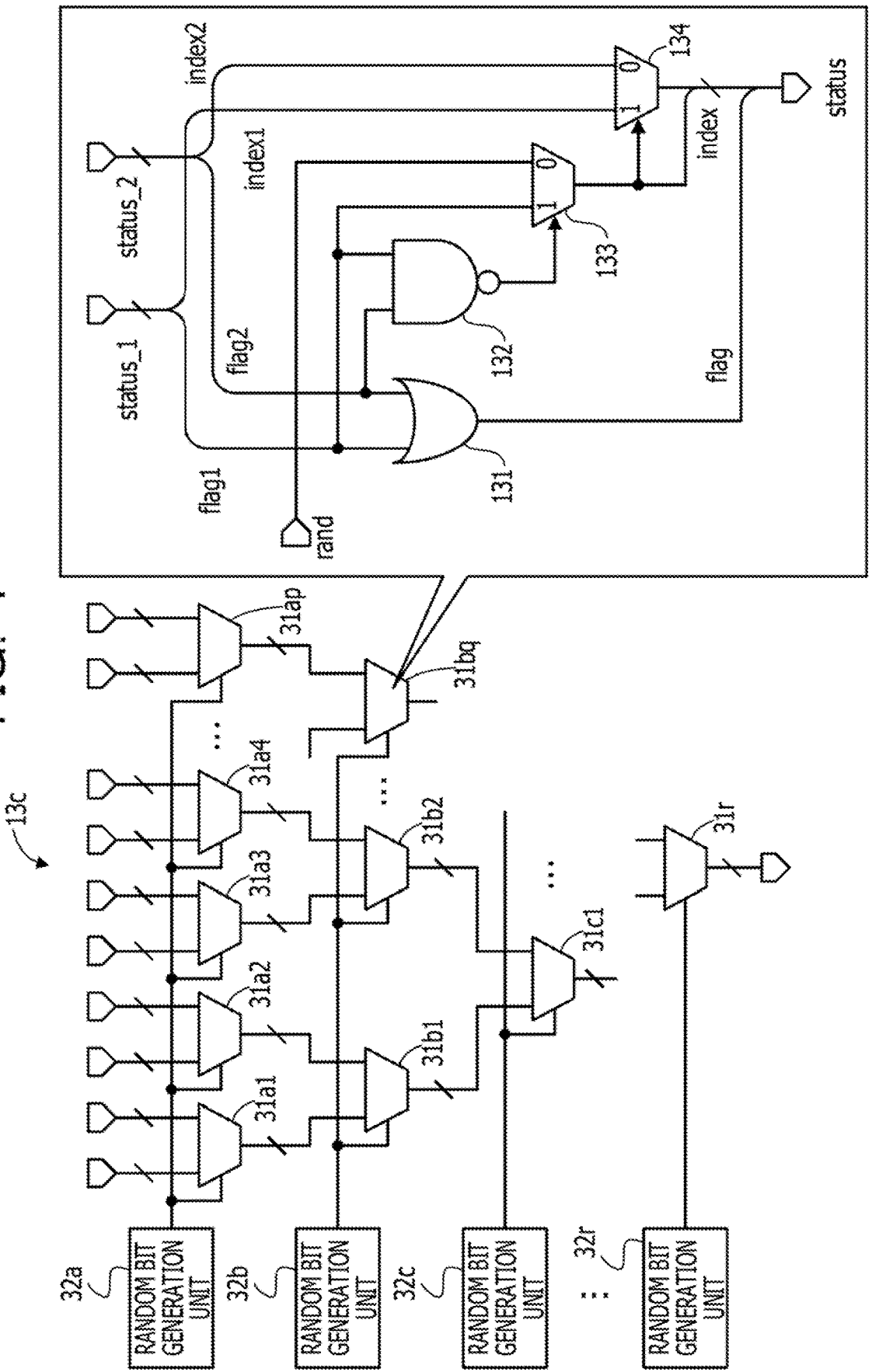
FIG. 4 is a diagram illustrating a circuit configuration example of a selector unit.

FIG. 4 is a diagram illustrating a circuit configuration example of the selector unit.

The selector unit 13c includes a plurality of selection circuits connected in a tree shape in a plurality of stages and random bit generation units 32a, 32b, 32c, . . . , and 32r. The random bit generation units 32a to 32r are provided at each stage of the plurality of selection circuits connected in the tree shape. Each of the random bit generation units 32a to 32r generates a one-bit random number taking a value of 0 or 1, and provides it to the selection circuits at each stage. The one-bit random number is used to select one of an input pair of flags.

Each of the first-stage selection circuits 31a1, 31a2, 31a3, 31a4, . . . , and 31ap receives the input of a set of flags each indicating whether the transition is enabled or disabled output from each of the state transition determination circuits 13b1 to 13bn. For example, the selection circuit 31a1 receives the input of a pair of a flag output from the first state transition determination circuit 13b1 and a flag output from the second state transition determination circuit 13b2. Furthermore, the selection circuit 31a2 receives the input of a pair of a flag output from the third state transition determination circuit and a flag output from the fourth state transition determination circuit. Thereafter, likewise, the selection circuit 31ap receives the input of a pair of a flag output from the (n−1)-th state transition determination circuit and a flag output from the n-th state transition determination circuit 13bn. Thus, a pair of flags output from adjacent state transition determination circuits are input to each first-stage selection circuit. The number of the first-stage selection circuits 31a1 to 31ap is n/2. Thereafter, the number of selection circuits is halved each time a stage is passed.

Each of the selection circuits 31a1 to 31ap selects one of the input pair of flags, based on the input pair of flags and the one-bit random number output from the random bit generation unit 32a. The selection circuits 31a1 to 31ap each output a status signal including the selected flag and a one-bit identification value corresponding to the selected flag to the second-stage selection circuits 31b1 to 31bq. For example, a status signal output from the selection circuit 31a1 and a status signal output from the selection circuit 31a2 are input to the selection circuit 31b1. Likewise, a pair of status signals output from adjacent selection circuits of the selection circuits 31a1 to 31ap are input to a second-stage selection circuit.

Each of the selection circuits 31b1 to 31bq selects one of the input status signals, based on the input pair of status signals and the one-bit random number output from the random bit generation unit 32b. The selection circuits 31b1 to 31bq each output the selected status signal to the third-stage selection circuits 31c1, . . . . Here, the selection circuits 31b1 to 31bq each update the status signal included in the selected status signal by adding one bit to indicate which status signal is selected, and output the selected status signal.

The same processing is performed in the selection circuits at the third and subsequent stages. The bit width of the identification value is increased by one bit in the selection circuits at each stage. The final-stage selection circuit 31r outputs a status signal that is the output of the selector unit 13c. The identification value included in the status signal output from the selector unit 13c corresponds to the index represented by a binary number. Note that in the circuit configuration example illustrated in FIG. 4, the indexes of the search units are 0 to 1023. A value obtained by adding one to the identification value output from the selection circuit 31r corresponds to j illustrated in FIG. 2.

For example, FIG. 4 illustrates a circuit configuration example of the selection circuit 31bq. The other selection circuits at the second and subsequent stages are implemented by the same circuit configuration as that of the selection circuit 31bq.

The inputs to the selection circuit 31bq are a first status signal (status_1) and a second status signal (status_2). The output of the selection circuit 31b1 is a status signal (status). The selection circuit 31bq includes an OR circuit 131, a NAND circuit 132, and selectors 133 and 134.

The OR circuit 131 receives the input of a flag (flag1) included in the status signal (status_1) and a flag (flag2) included in the status signal (status_2). For example, the status signal (status_1) is the output of the higher side (the side with a larger index) of the two selection circuits at the previous stage, and the status signal (status_2) is the output of the lower side (the side with a smaller index) of the two selection circuits at the previous stage. The OR circuit 131 outputs an OR operation result (flag) of flag1 and flag2.

The NAND circuit 132 receives the input of flag1 and flag2. The NAND circuit 132 outputs a NAND operation result of the flag1 and the flag2 to a selection signal input terminal of the selector 133.

The selector 133 receives the input of flag1 and a one-bit random number (rand). The selector 133 selects and outputs either flag1 or rand, based on the NAND operation result input from the NAND circuit 132. For example, the selector 133 selects flag1 when the NAND operation result of the NAND circuit 132 is "1", and selects rand when the NAND operation result of the NAND circuit 132 is "0".

The selector 134 receives the input of an identification value (index1) included in the status signal (status_1) and an identification value (Index2) included in the status signal (status_2). The selection result of the selector 133 is input to a selection signal input terminal of the selector 134. The selector 134 selects and outputs either index1 or index2, based on the selection result of the selector 133. For example, the selector 134 selects index1 when the selection result of the selector 133 is "1", and selects index2 when the selection result of the selector 133 is "0".

A set of outputs from the OR circuit 131 and the selectors 133 and 134 becomes the status signal (status) output from the selection circuit 31bq.

Note that inputs to each first-stage selection circuit do not include an identification value. Thus, each first-stage selection circuit is a circuit that adds a bit value corresponding to a selected one ("0" for the lower side and "1" for the higher side) as an identification value (denoted as index in the figure) for output.

As described above, the selector unit 13c selects one of the spin bits whose transition is enabled by a tournament method. In each game of the tournament (i.e., for example, a selection in each selection circuit), the entry number (0 or 1) of the winner (i.e. the selected one) is added to higher-order bits of an index word. The index output from the final-stage selection circuit 31r indicates the selected spin bit. For example, when the number of spin bits in one search unit is 1024, the status signal output from the final-stage selection circuit 31r includes a flag indicating whether the transition is enabled or disabled and an index represented by ten bits.

However, for a method of outputting an index, a method other than the method of generating it in the selector unit 13c as described above is possible. For example, an index corresponding to each state transition determination circuit may be provided from each of the state transition determination circuits 13b1 to 13bn to the selector unit 13c, and the selector unit 13c may select a flag indicating whether the transition is enabled or disabled and an index corresponding to the flag. In this case, each of the state transition determination circuits 13b1 to 13bn further includes an index register for storing the index corresponding to itself, and provides the index to the selector unit 13c from the index register.

Figure 5:
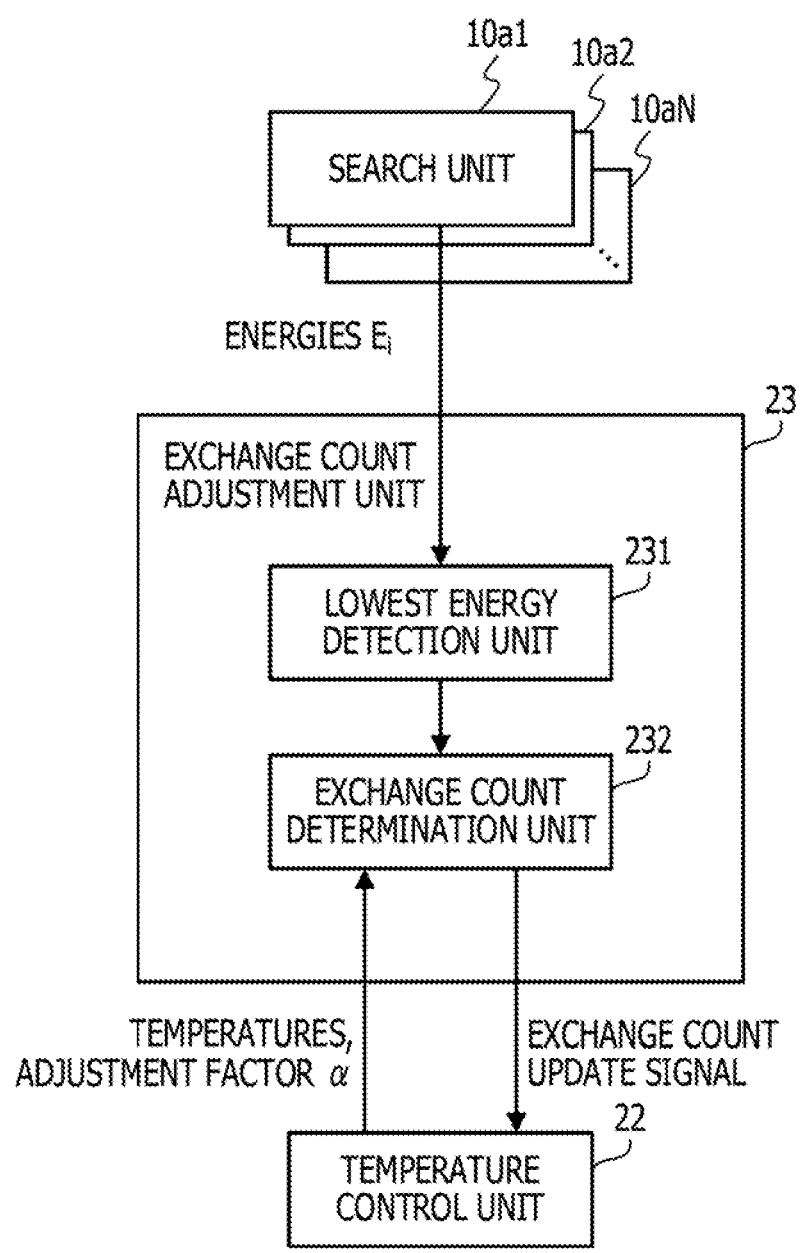
FIG. 5 is a diagram illustrating a circuit configuration example of an exchange count adjustment unit.

FIG. 5 is a diagram illustrating a circuit configuration example of the exchange count adjustment unit.

The exchange count adjustment unit 23 includes a lowest energy detection unit 231 and an exchange count determination unit 232.

The lowest energy detection unit 231 acquires the energy $E_i$ from each of the search units 10a1 to 10aN at the exchange timing that occurs in the replica exchange cycle. The lowest energy detection unit 231 detects the lowest energy from the acquired energies, and provides identification information of a search unit corresponding to the lowest energy to the exchange count determination unit 232.

The exchange count determination unit 232 acquires the temperature set for each of the search units 10a1 to 10aN and the adjustment factor α from the temperature control unit 22. Furthermore, the exchange count determination unit 232 acquires the identification information of the search unit with the lowest energy from the lowest energy detection unit 231.

The exchange count determination unit 232 identifies the temperature set for the search unit with the lowest energy among the search units 10a1 to 10aN. Furthermore, the exchange count determination unit 232 identifies the minimum temperature of the temperatures set for the search units 10a1 to 10aN. The exchange count determination unit 232 increases the exchange count as the difference between the temperature set for the search unit with the lowest energy and the minimum temperature increases.

Specifically, for example, when the search unit having the lowest energy is counted to cnt in the temperature order from the search unit with the minimum temperature, the exchange count determination unit 232 sets, as an exchange count c, a value obtained by multiplying cnt by the adjustment factor α ($0<α≤1$) and rounding the result to an integer. As a method of rounding to an integer, for example, a method of rounding off, rounding down, or rounding up the first decimal place, or the like is possible. The exchange count determination unit 232 may obtain the exchange count c by the calculation of the exchange count c=max(cnt×α, 1). The exchange count determination unit 232 provides an exchange count update signal indicating the determined exchange count c to the temperature control unit 22.

In this way, the exchange count determination unit 232 acquires, as a temperature difference, the number of set temperatures (cnt) from the minimum temperature to the temperature set for the search unit corresponding to the lowest energy value, and determines the exchange count c, based on the difference. For example, the exchange count determination unit 232 determines a value obtained by multiplying the number (cnt) by a coefficient (a) as an exchange count.

Figure 6:
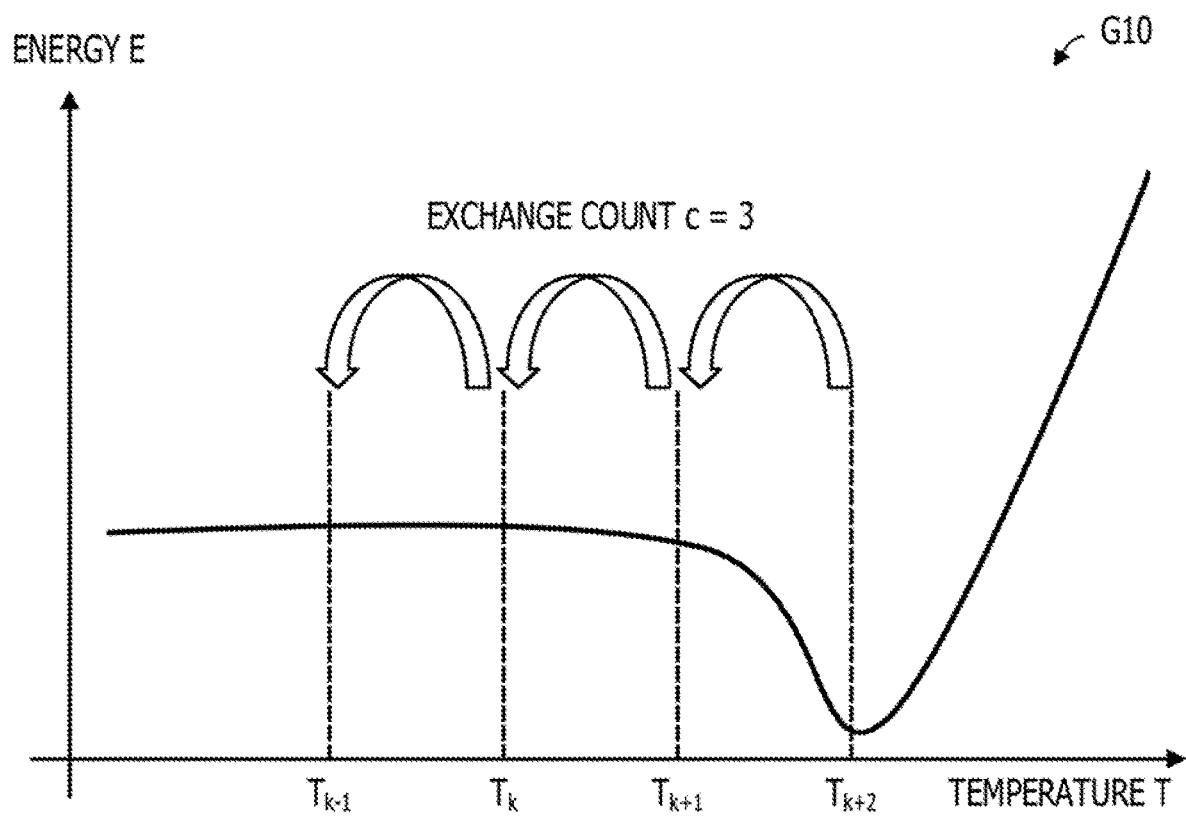
FIG. 6 is a diagram illustrating an example of determining a replica exchange count.

FIG. 6 is a diagram illustrating an example of determining a replica exchange count.

A graph G10 illustrates the relationship between the temperature T set for each of the search units 10a1 to 10aN and the energy E output from each of the search units 10a1 to 10aN at the exchange timing. The horizontal axis of the graph G10 is the temperature T, and the vertical axis is the energy E. FIG. 6 illustrates a case where the exchange count c=3. Furthermore, the temperature set for the search unit with the lowest energy is $T_{k+2}$. The temperature $T_{k+1}$ is a temperature one step lower than $T_{k+2}$. $T_k$ is a temperature two steps lower than $T_{k+2}$. $T_{k-1}$ is a temperature three steps lower than $T_{k+2}$. In one example, when the exchange count c=3, the search unit having the lowest energy at this exchange timing is expected to be decreased in temperature by up to three steps.

Thus, by determining the exchange count of replica exchange based on the difference between the temperature of the search unit having the lowest energy and the minimum temperature, the optimization device 2 can increase the possibility that the temperature set for the search unit having the lowest energy is shifted to the low-temperature side relatively quickly.

Next, a processing procedure of the optimization device 2 will be described.

Figure 7:
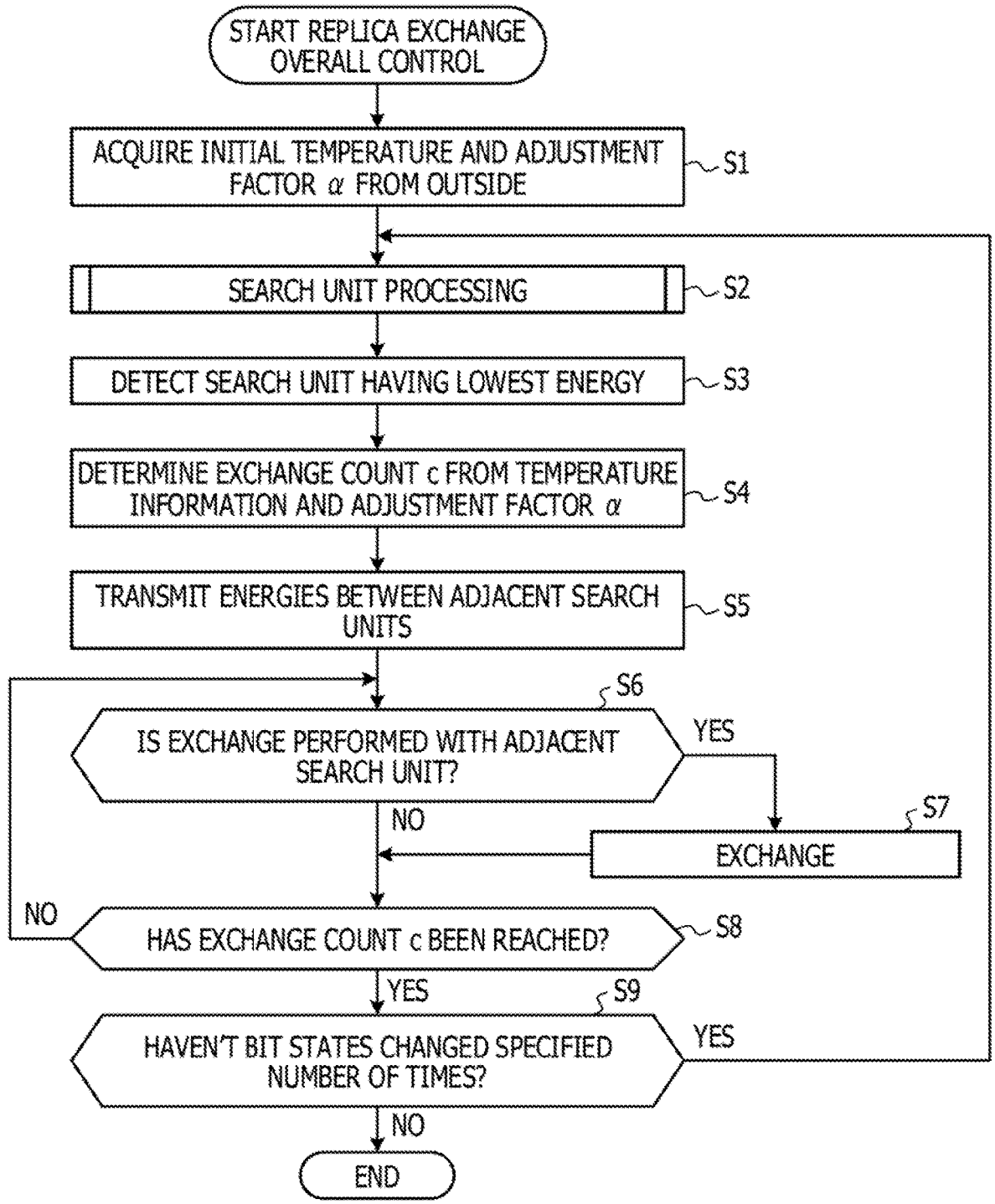
FIG. 7 is a flowchart illustrating an overall control example of replica exchange.

FIG. 7 is a flowchart illustrating an overall control example of replica exchange.

(S1) The overall control unit 21 acquires initial temperature and the adjustment factor α as input data from the outside. Furthermore, the overall control unit 21 acquires the exchange count specification signal indicating the initial value of the exchange count from the outside. The overall control unit 21 outputs to the temperature control unit 22 the start signal including the initial temperature, the exchange count specification signal, and the adjustment factor α.

(S2) Upon receiving the start signal from the overall control unit 21, the temperature control unit 22 sets temperatures by outputting the temperature information indicating the initial temperature and the temperature setting signal to each of the search units 10a1 to 10aN, and causes each of the search units 10a1 to 10aN to execute the probabilistic search processing. Details of the processing (search unit processing) by each of the search units 10a1 to 10aN will be described later.

(S3) When each of the search units 10a1 to 10aN has executed the probabilistic search for a specified time or a specified iteration count, the exchange count adjustment unit 23 acquires an energy value from each of the search units 10a1 to 10aN, and detects a search unit having the lowest energy.

(S4) The exchange count adjustment unit 23 acquires the temperature set for each of the search units 10a1 to 10aN and the adjustment factor α from the temperature control unit 22. The exchange count adjustment unit 23 determines the exchange count c, based on the minimum temperature of the temperatures set for the search units 10a1 to 10aN, the adjustment factor α, and the temperature set for the search unit having the lowest energy. For example, the exchange count adjustment unit 23 detects the lowest energy and a search unit having the lowest energy by the function of the lowest energy detection unit 231 illustrated in FIG. 5. Furthermore, the exchange count adjustment unit 23 determines the exchange count c by calculating the exchange count c=max(cnt×α, 1) by the function of the exchange count determination unit 232 illustrated in FIG. 5. The exchange count adjustment unit 23 outputs the exchange count update signal indicating the determined exchange count c to the temperature control unit 22. The temperature control unit 22 initializes the number of counts of the exchange count to zero.

(S5) The search units 10a1 to 10aN transmit the energies between the adjacent search units to the temperature control unit 22. The temperature control unit 22 acquires the energy values calculated by the search units 10a1 to 10aN for each pair of search units with adjacent temperatures.

(S6) The temperature control unit 22 increments the number of counts of the exchange count, and determines on a certain search unit whether to perform a temperature exchange with a search unit with an adjacent temperature. The temperature control unit 22 determines whether to perform an exchange for each pair of search units, based on the exchange probability of Equation (5). If an exchange is performed on a certain pair of search units, the process proceeds to step S7. If no exchange is performed on the pair of search units, the process proceeds to step S8.

(S7) The temperature control unit 22 performs a temperature exchange on the pair of search units on which it is determined that an exchange be performed in step S6. The temperature control unit 22 does not perform a temperature exchange on the pair of search units on which it is determined that no exchange be performed in step S6.

(S8) The temperature control unit 22 determines whether the number of counts of the temperature exchange count has reached c. If the number of counts of the exchange count has reached c, the process proceeds to step S9. If the number of counts of the exchange count has not reached c, the process proceeds to step S6.

(S9) The overall control unit 21 acquires the bit states from the search units 10a1 to 10aN, and determines whether the bit states in the search unit with the minimum temperature have not changed a specified number of times. When the bit states in the search unit with the minimum temperature have not changed, the overall control unit 21 completes the overall control processing of replica exchange. If the bit states in the search unit with the minimum temperature have changed, the overall control unit 21 proceeds the process to step S2 and continues the probabilistic search processing.

For example, when the overall control processing of replica exchange is completed, the overall control unit 21 outputs the bit states in the search unit with the minimum temperature as a solution to the optimization problem. Alternatively, the overall control unit 21 may output the bit states with the lowest energy obtained in the overall control process of replica exchange as a solution to the optimization problem.

Furthermore, in the above example, the optimization device 2 determines the exchange count c each time the search unit processing in step S2 is completed, but may determine the exchange count c after the search unit processing is repeated a plurality of times. Furthermore, the optimization device 2 may determine the exchange count c in the first half of the total iteration, and use the exchange count c determined in the first half in the second half of the total iteration without performing new determination of the exchange count c.

Here, as an example of one exchange processing (exchange processing executed at one exchange timing) in step S7, various patterns are possible. Assume that the temperature control unit 22 performs an exchange between a pair of search units with adjacent temperatures because if the temperatures are apart (the temperature difference is large), the exchange probability based on Equation (5) is reduced.

In a first pattern, at one exchange timing, an even-numbered or odd-numbered search unit when the search units are arranged in ascending or descending temperature order is focused on, and an exchange is performed with another search unit adjacent in temperature to the search unit (the search unit with a number one smaller or one larger than the number being focused on).

In a second pattern, at one exchange timing, the following first sub-processing and second sub-processing are sequentially performed. In the first sub-processing, an even-numbered search unit when the search units are arranged in ascending or descending temperature order is focused on, and an exchange is performed with another search unit adjacent in temperature to the search unit. In the second sub-processing, an odd-numbered search unit when the search units are arranged in ascending or descending temperature order is focused on, and an exchange is performed with another search unit adjacent in temperature to the search unit.

The one exchange processing may be a pattern other than the first pattern and the second pattern.

For example, assume that one exchange processing is described as (even number·odd number) according to the even and odd numbers of search units to be focused on sequentially when the search units are arranged in ascending or descending temperature order. In this case, the description of (even number·odd number)–(even number·odd number)– . . . indicates that the above-described second pattern is repeatedly executed at each exchange timing.

In a third pattern, the order of even and odd numbers to be focused on at each exchange timing is reverse to that of the second pattern, (odd number·even number)–(odd number·even number)– . . . .

In a fourth pattern, the order of even and odd numbers to be focused on is changed at each exchange timing, (odd number·even number)–(even number·odd number)–(odd number·even number)– . . . .

In a fifth pattern, sub-processing is executed three times at one exchange processing, changing the order of even and odd numbers to be focused on at each exchange timing, (odd number·even number·odd number)–(even number·odd number·even number)–(odd number·even number·odd number)– . . . .

The above-described one exchange processing patterns are an example, and various patterns other than the above may be used. For example, the number of executions of sub-processing included in one exchange processing may be four or more.

FIG. 8 is a flowchart illustrating an example of the search unit processing.

The search unit processing corresponds to step S2.

(S10) The temperature control unit 22 sets a temperature for each of the search units 10a1 to 10aN. For example, the temperature control unit 22 sets a temperature for each of the search units 10a1 to 10aN, based on the first correspondence information in which the temperature indexes are associated with the temperatures and the second correspondence information in which the temperature indexes are associated with the identification information of the search units described above. Alternatively, the temperature control unit 22 may set a temperature for each of the search units 10a1 to 10aN, based on the correspondence information in which the identification information of the search units is associated with the temperatures, as described above. Note that the initial value of the temperature set for each of the search units 10a1 to 10aN is determined in advance according to a problem or the like.

(S11) Each of the search units 10a1 to 10aN calculates a local field for each spin bit. For example, focusing on the search unit 10a1, the h calculation units 12b1 to 12bn calculate the local fields $h_1$ to $h_n$. The local field h is calculated based on Equation (10). Note that after the local field h is calculated by Equation (10), an updated local field h=h+δh can be obtained, for example, by adding a difference h represented by Equation (11) to the local field h.

(S12) Each of the search units 10a1 to 10aN calculates the energy change value ΔE for each spin bit, based on the calculated local field h. For example, focusing on the search unit 10a, the ΔE generation units 12c1 to 12cn calculate the energy change values $\Delta E_1$ to $\Delta E_n$. ΔE is calculated based on Equation (9).

(S13) Each of the search units 10a1 to 10aN adds the offset value $E_{off}$ to the energy change value –ΔE. For example, focusing on the search unit 10a1, the adders 13a1 to 13an add the offset value $E_{off}$ to $-\Delta E_1$ to $-\Delta E_n$. The offset value $E_{off}$ is controlled by the offset control unit 13d as described above. For example, when a flag indicating whether the transition is enabled or disabled output from the selector unit 13c indicates that the transition is disabled, the offset control unit 13d provides the offset value $E_{off}$ greater than zero to the adders 13a1 to 13an. When the flag indicates that the transition is enabled, the offset control unit 13d provides the offset value $E_{off}$=0 to the adders 13a1 to 13an.

(S14) Each of the search units 10a1 to 10aN selects a spin bit to be flipped among spin bits that are flip candidates. For example, focusing on the search unit 10a1, each of the state transition determination circuits 13b1 to 13bn outputs to the selector unit 13c a flag indicating whether the transition of the spin bit corresponding to the state transition determination circuit is enabled or disabled. The selector unit 13c selects one of the input flags, and outputs the selected flag and the index indicating the spin bit corresponding to the selected flag.

(S15) Each of the search units 10a1 to 10aN flips the selected spin (spin bit). For example, focusing on the search unit 10a1, the state holding unit 11a updates the value of the spin bit indicated by the index among the spin bits included in the bit states, based on the flag and the index output from the selector unit 13c.

(S16) Each of the search units 10a1 to 10aN determines whether the specified iteration count has been reached or the specified time has elapsed since the start time of the probabilistic search immediately after step S10. If the specified iteration count has been reached or the specified time has elapsed, the process proceeds to step S17. If the specified iteration count has not been reached and the specified time has not elapsed, the process proceeds to step S11.

(S17) Each of the search units 10a1 to 10aN calculates the energy value ($E_1$ to $E_N$) in the search unit, and outputs it to the temperature control unit 22 and the exchange count adjustment unit 23. That completes the search unit processing.

Figure 9A:
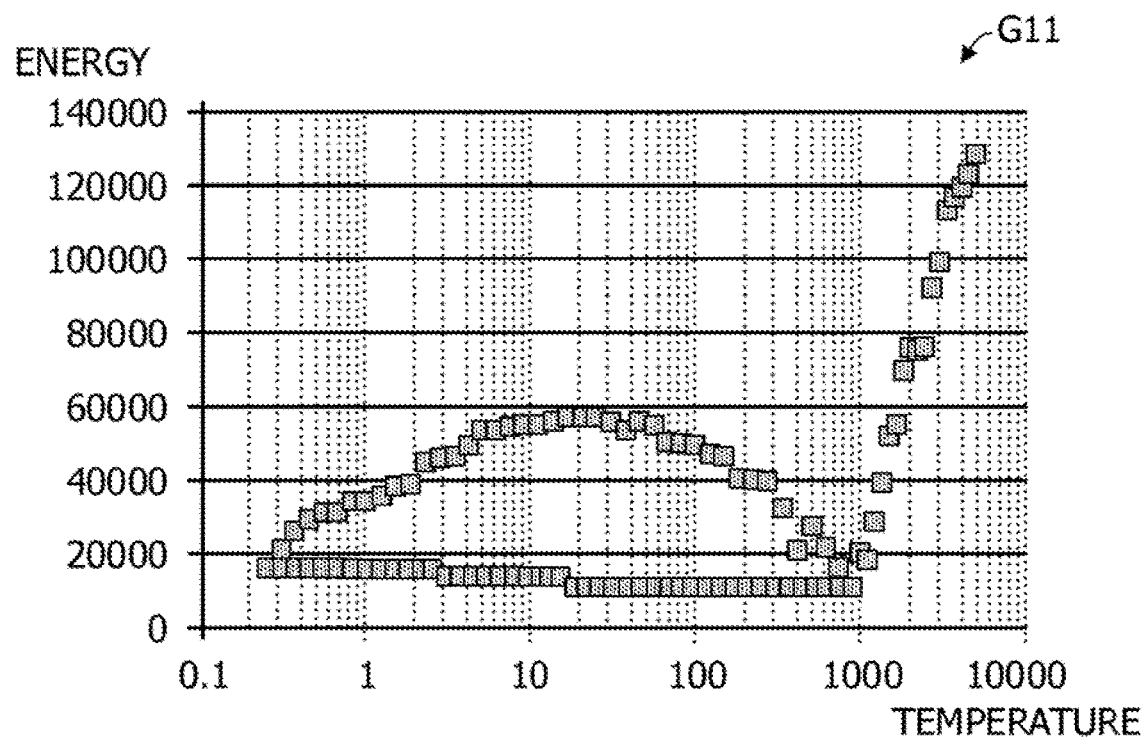
FIGS. 9A and 9B are diagrams illustrating examples of the relationship between temperature and energy of solutions.
Figure 9B:
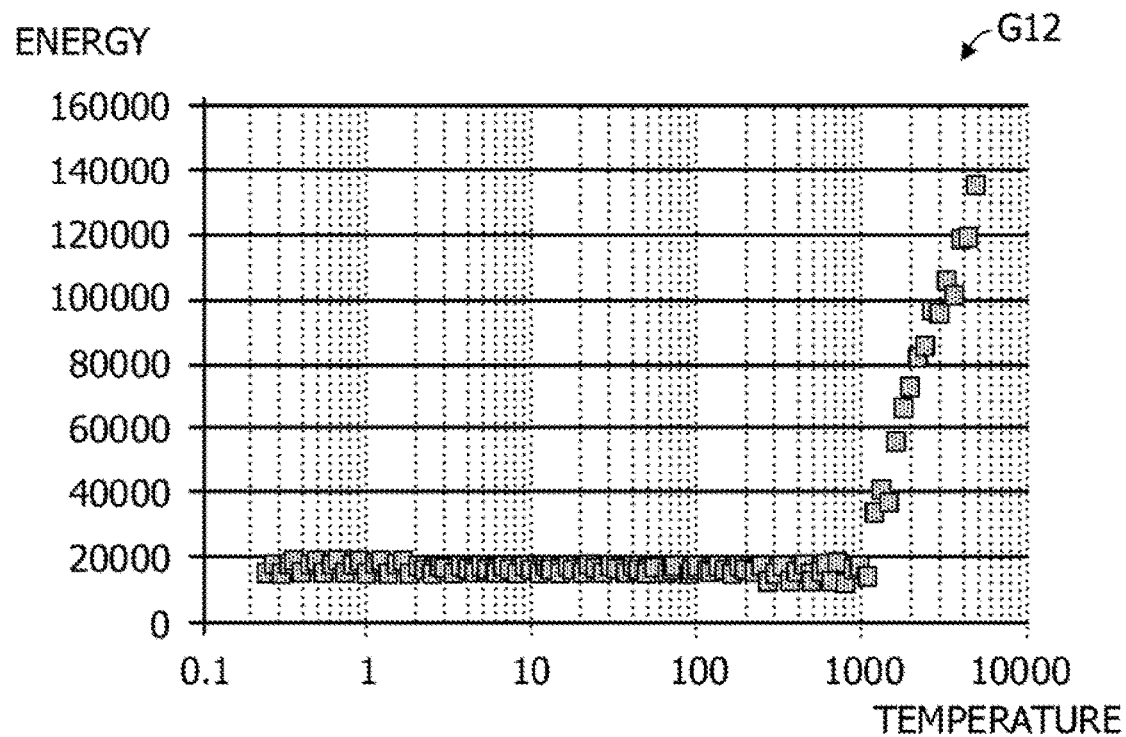

FIGS. 9A and 9B are diagrams illustrating examples of the relationship between temperature and energy of solutions.

FIG. 9A illustrates a graph G11 of a comparative example where the exchange count is preset to two. FIG. 9B illustrates a graph G12 when the exchange count is set to three by the exchange count adjustment unit 23. Each of the graphs G11 and G12 illustrates the relationship between the temperatures set for the search units and energies corresponding to solutions (bit states) obtained from the search units. The horizontal axis in each of the graphs G11 and G12 is temperature, and the vertical axis is energy.

The graphs G11 and G12 are results when the specified iteration count in the probabilistic search (search unit processing in FIG. 8) is set to 1,000, and the iteration count has reached 50,000. Comparison between the graphs G11 and G12 shows that when the exchange count is set to three by the exchange count adjustment unit 23, more search units have lower energies than when the exchange count is preset to two.

As described above, the optimization device 2 can speed up a search for the ground state.

Here, as a hardware configuration of the optimization device 2, the following example is also possible.

Figure 10:
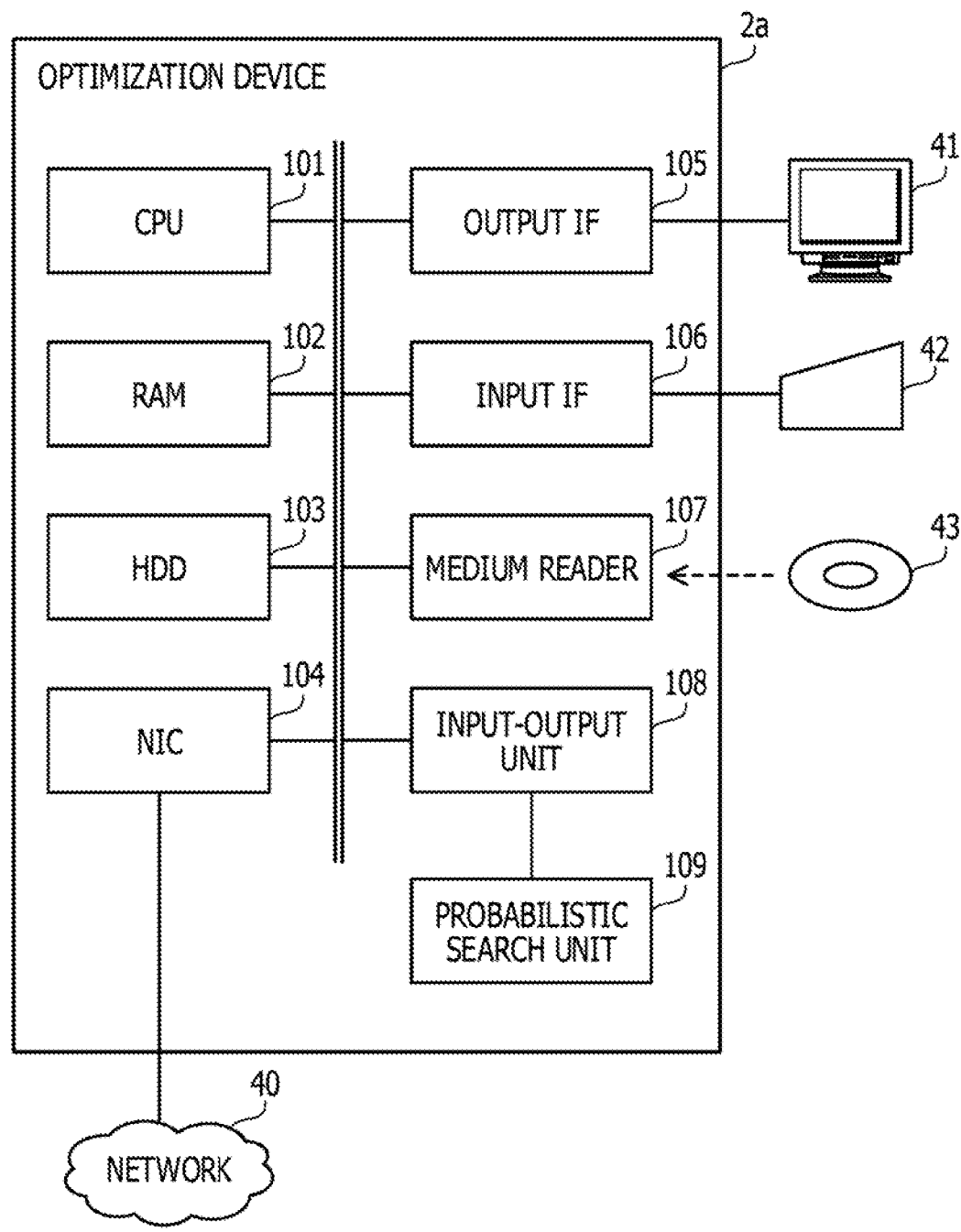
FIG. 10 is a diagram illustrating another configuration example of the optimization device.

FIG. 10 is a diagram illustrating another configuration example of the optimization device.

An optimization device 2a includes a CPU 101, random-access memory (RAM) 102, a hard disk drive (HDD) 103, a network interface card (NIC) 104, an output interface (IF) 105, an input IF 106, a medium reader 107, an input-output unit 108, and a probabilistic search unit 109. The hardware of the optimization device 2a is connected to a bus of the optimization device 2a.

The CPU 101 is a processor that executes program instructions. The CPU 101 loads at least part of programs and data stored in the HDD 103 into the RAM 102 to execute the programs. Note that the CPU 101 may include a plurality of processor cores. Furthermore, the optimization device 2a may include a plurality of processors. A set of a plurality of processors are sometimes referred to as a "multiprocessor" or simply a "processor". The CPU 101 can implement the functions of, for example, the overall control unit 21 and the exchange count adjustment unit 23 by processing of software (a control program) executed by the CPU 101. Furthermore, the function of the temperature control unit 22 may also be implemented by the CPU 101.

The RAM 102 is volatile semiconductor memory that temporarily stores programs executed by the CPU 101 and data used by the CPU 101 for operations. Note that the optimization device 2a may include a type of memory other than RAM, or may include a plurality of memories.

The HDD 103 is a non-volatile storage device that stores programs of software such as an operating system (OS), middleware, and application software, and data. Note that the optimization device 2a may include another type of storage device such as a flash memory or a solid state drive (SSD), or may include a plurality of nonvolatile storage devices.

The NIC 104 is an interface that is connected to a network 40 and communicates with other computers via the network 40. The NIC 104 is connected to a communication device such as a switch or a router by a cable, for example. The NIC 104 may be connected to the network 40 by radio link.

The output IF 105 outputs an image to a display 41 connected to the optimization device 2a, according to a command from the CPU 101. As the display 41, any type of display such as a cathode-ray tube (CRT) display, a liquid crystal display (LCD), a plasma display, or an organic electroluminescence (OEL) display may be used.

The input IF 106 acquires an input signal from an input device 42 connected to the optimization device 2a, and outputs the signal to the CPU 101. As the input device 42, a pointing device such as a mouse, a touch panel, a touch pad, and a trackball, a keyboard, a remote controller, and a button switch may be used. Furthermore, a plurality of types of input devices may be connected to the optimization device 2a.

The medium reader 107 is a reading device that reads a program or data recorded on a recording medium 43. As the recording medium 43, for example, a magnetic disk, an optical disk, a magneto-optical (MO) disk, a semiconductor memory, or the like may be used. Magnetic disks include a flexible disk (FD) and an HDD. Optical disks include a compact disc (CD) and a digital versatile disc (DVD).

The medium reader 107 copies, for example, a program or data read from the recording medium 43 to another recording medium such as the RAM 102 or the HDD 103. The read program is executed by the CPU 101, for example. Note that the recording medium 43 may be a portable recording medium, and may be used for distribution of a program or data. Furthermore, the recording medium 43 and the HDD 103 may be sometimes referred to as computer-readable recording media.

The input-output unit 108 is connected to the probabilistic search unit 109, and controls data input from the CPU 101 to the probabilistic search unit 109 and data output from the probabilistic search unit 109 to the RAM 102 and the CPU 101.

The probabilistic search unit 109 is an accelerator that performs operations on a combinatorial optimization problem by hardware, using a replica-exchange method. The probabilistic search unit 109 includes the search units 10a1 to 10aN and the temperature control unit 22, and performs a probabilistic search of searching for the ground state of the Ising model, using the above-described procedures in FIGS. 7 and 8.

The above-described optimization device 2a can implement the same functions as the optimization device 2.

Figure 11:
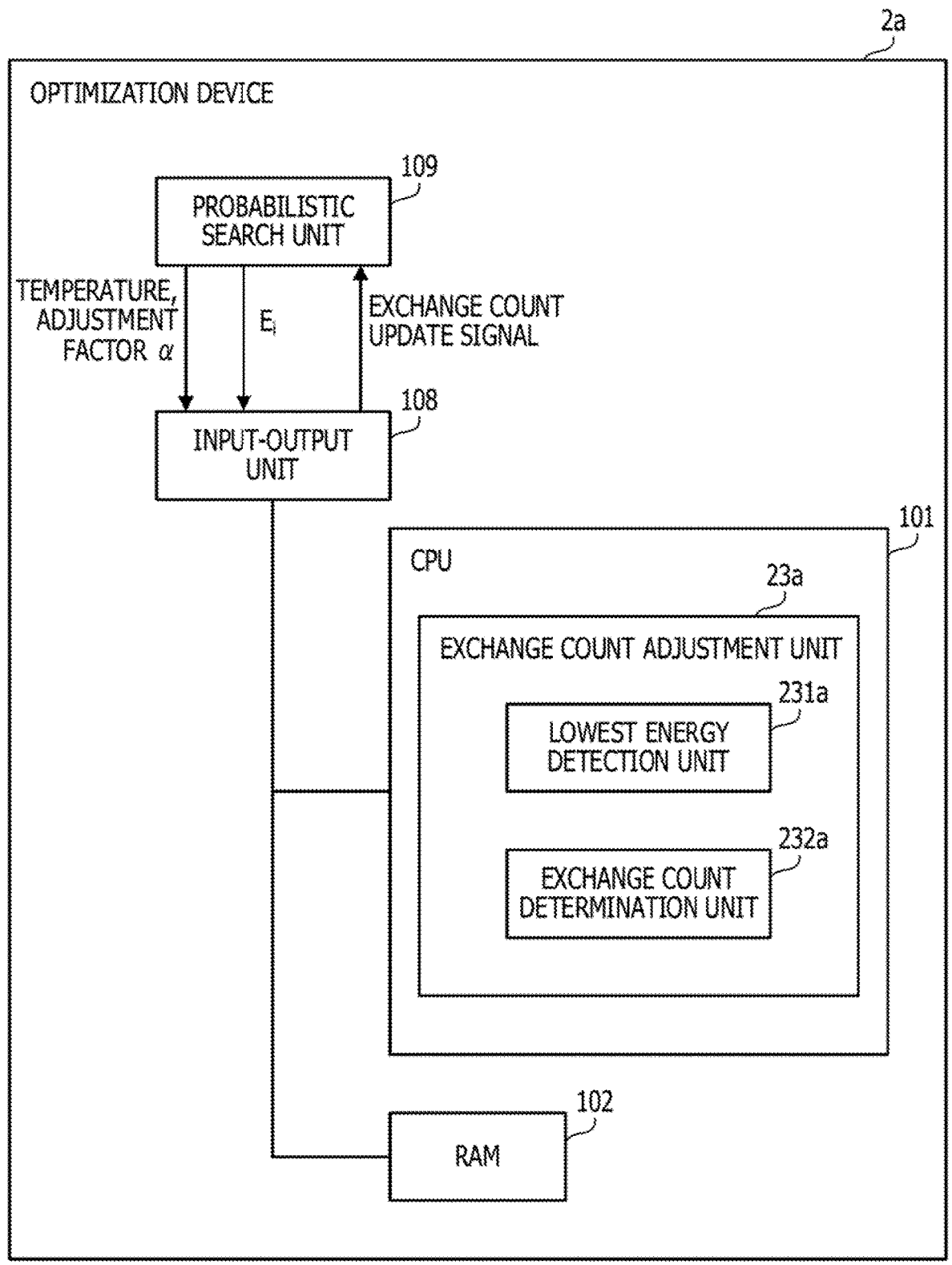
FIG. 11 is a diagram illustrating a function example of the optimization device.

FIG. 11 is a diagram illustrating a function example of the optimization device.

For example, the CPU 101 executes a program stored in the RAM 102 to perform the function of an exchange count adjustment unit 23a. The exchange count adjustment unit 23a includes a lowest energy detection unit 231a and an exchange count determination unit 232a.

The lowest energy detection unit 231a corresponds to the above-described lowest energy detection unit 231. The exchange count determination unit 232a corresponds to the above-described exchange count determination unit 232.

The exchange count adjustment unit 23a acquires the temperature set for each search unit, the adjustment factor $\alpha$, and the energy $E_i$ corresponding to the bit states of each search unit from the probabilistic search unit 109 via the input-output unit 108. Furthermore, the exchange count adjustment unit 23a provides an exchange count update signal indicating an exchange count determined by the function of the exchange count determination unit 232a to the probabilistic search unit 109 via the input-output unit 108.

As described above, the function of the exchange count adjustment unit 23a may be implemented by the CPU 101. According to the optimization device 2a, like the optimization device 2, a search for the ground state can be speeded up.

Third Embodiment

Next, a third embodiment will be described. Matters different from the above-described second embodiment will be mainly described, and descriptions of common matters will be omitted.

The third embodiment provides a function to control such that a lower temperature is assigned to a lower energy state at the execution of replica exchange in the first half of the total iteration.

Figure 12:
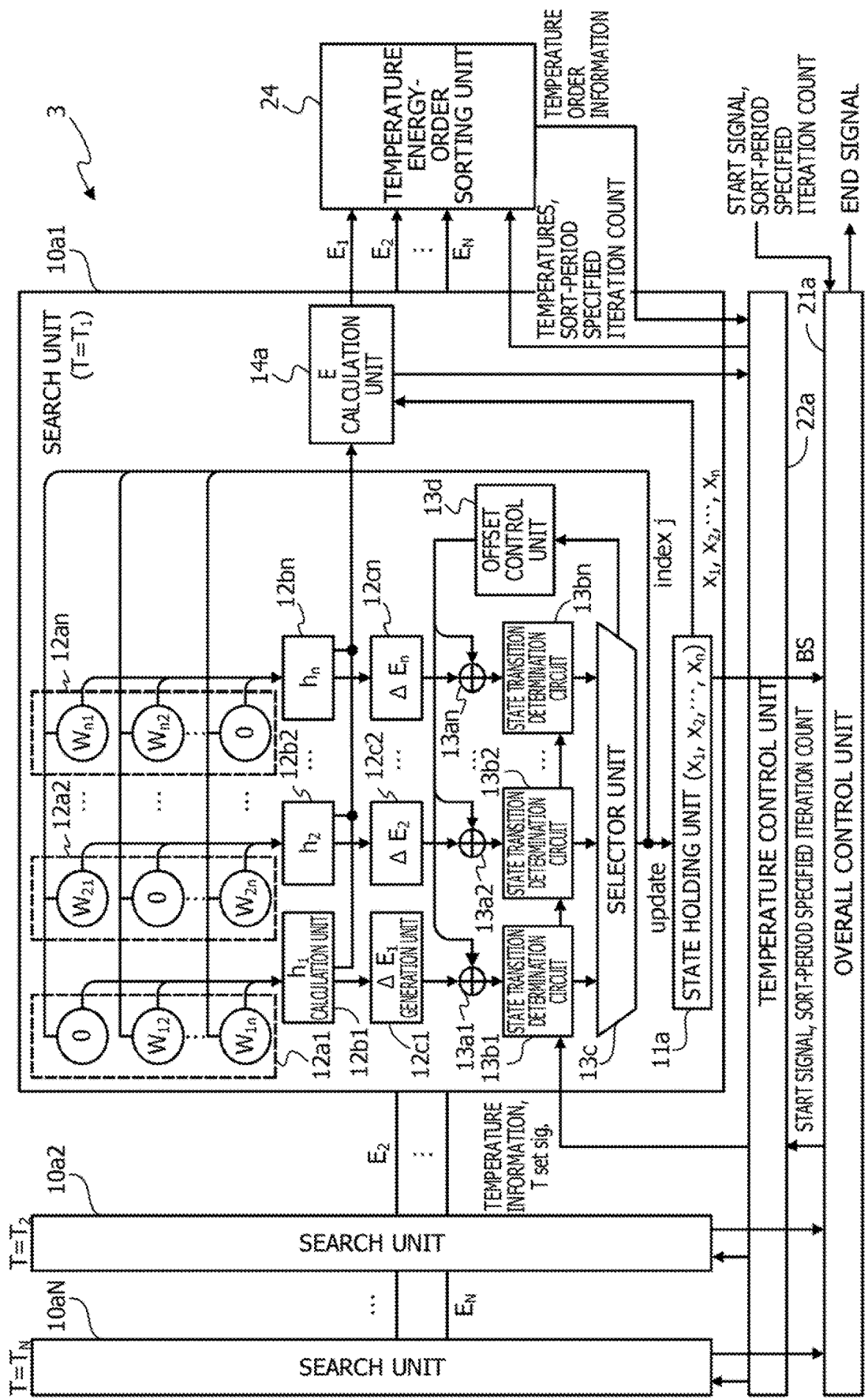
FIG. 12 is a diagram illustrating a circuit configuration example of an optimization device according to a third embodiment.

FIG. 12 is a diagram illustrating a circuit configuration example of an optimization device according to the third embodiment.

An optimization device 3 is implemented using, for example, a semiconductor integrated circuit such as an FPGA. The optimization device 3 includes search units 10a1 to 10aN, an overall control unit 21a, a temperature control unit 22a, and a temperature energy-order sorting unit 24.

The search units 10a1 to 10aN have the same circuit configuration as the search units 10a1 to 10aN illustrated in FIG. 2, and thus will not be described.

The overall control unit 21a controls the overall operation of the optimization device 3. The overall control unit 21a receives the input of a sort-period specified iteration count together with a start signal. The sort-period specified iteration count is smaller than the total iteration count. The overall control unit 21a outputs the start signal and the sort-period specified iteration count to the temperature control unit 22a, and activates the search units 10a1 to 10aN to cause them to start the operation of a ground state search on an optimization problem. When the operation is completed, the overall control unit 21a acquires bit states from each of the search units 10a1 to 10aN to obtain a solution to the optimization problem. The overall control unit 21a outputs an end signal indicating the completion of the operation. The end signal may include information Indicating the solution obtained by the operation. For example, the overall control unit 21a may output image information indicating the solution to a display device connected to the optimization device 3, and cause the display device to display the image information indicating the solution, thereby presenting the content of the obtained solution to a user.

The temperature control unit 22a controls a temperature provided to each of the search units 10a1 to 10aN. The temperature control unit 22a provides temperature information indicating the temperature and a temperature setting signal (T set sig.) to the state transition determination circuits included in each of the search units 10a1 to 10aN.

Furthermore, the temperature control unit 22a controls the exchange of temperatures (temperature exchange) in the search units 10a1 to 10aN. The temperature control unit 22 determines whether to perform a temperature exchange (e.g., for example, a replica exchange) for a pair of search units (a set of two search units) with adjacent temperatures, based on the exchange probability of Equation (5), on a pair-by-pair basis. The temperature control unit 22 provides the exchanged temperature to each search unit.

Moreover, the temperature control unit 22a sets a temperature for each search unit determined by the temperature energy-order sorting unit 24 for the search unit each time a specified number of replica exchanges are performed until the sort-period specified iteration count of the total iteration has been reached since the first time.

The temperature energy-order sorting unit 24 acquires the temperature set for each search unit and the sort-period specified iteration count from the temperature control unit 22a. Furthermore, the temperature energy-order sorting unit 24 acquires the energies $E_i$ from the search units 10a1 to 10aN. The temperature energy-order sorting unit 24 assigns lower temperatures in ascending energy order each time the specified number of replica exchanges are performed until a first sort-period specified iteration count of the total iteration is reached. In other words, for example, the temperature energy-order sorting unit 24 sorts the temperatures in energy order using the temperature and energy of each search unit as input, and determines a temperature to be set for each search unit. The temperature energy-order sorting unit 24 outputs temperature order information indicating the temperature set for each search unit to the temperature control unit 22a.

Figure 13:
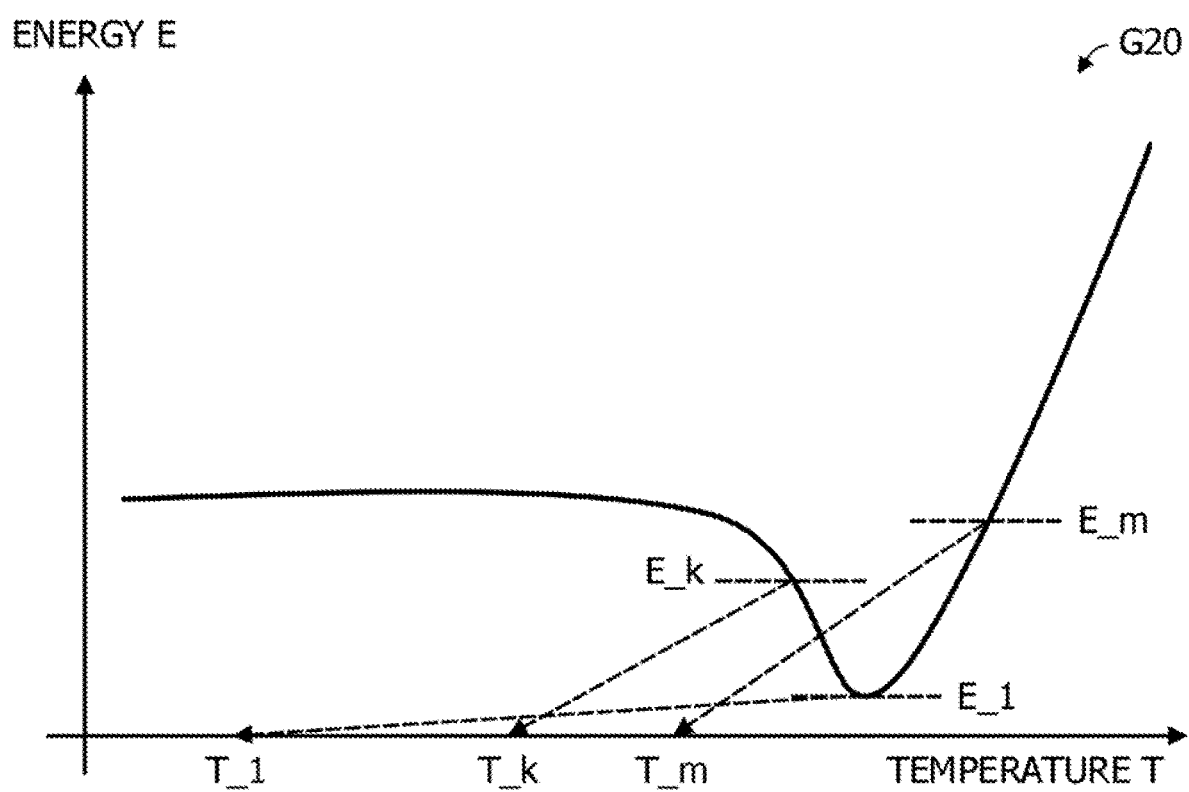
FIG. 13 is a diagram illustrating a first example of temperature energy-order sorting.

FIG. 13 is a diagram illustrating a first example of temperature energy-order sorting.

The optimization device 3 determines a temperature to be set for each search unit so that a lower temperature is assigned a lower energy state when executing a replica exchange in the first half of the total iteration. Note that only this control to assign a lower temperature to a lower energy state may not satisfy the detailed balance condition. Therefore, when executing a replica exchange in the second half of the total iteration, the optimization device 3 performs only a normal replica exchange without determining a set temperature for each search unit by the temperature energy-order sorting unit 24. Thus, the states of the search units can be appropriately moved toward the ground state.

Here, a graph G20 illustrates the relationship between the temperature of each search unit and the energy corresponding to the bit states of each search unit at a certain timing. The horizontal axis of the graph G20 is the temperature T, and the vertical axis is the energy E. The notation "E_x" represents the x-th smallest energy counted from the smallest. The notation "_x" represents the x-th lowest temperature counted from the lowest. Furthermore, assume that 1<k<m.

For example, consider three certain search units (first to third search units). Assume that the energy in the first search unit is E_k, the energy in the second search unit is E_1, and the energy in the third search unit is E_m. E_1 is the lowest energy of the energies in the search units. In this case, the temperature energy-order sorting unit 24 determines that the temperature T_1 be assigned to the second search unit, the temperature T_k be assigned to the first search unit, and the temperature T_m be assigned to the third search unit.

Figure 14:
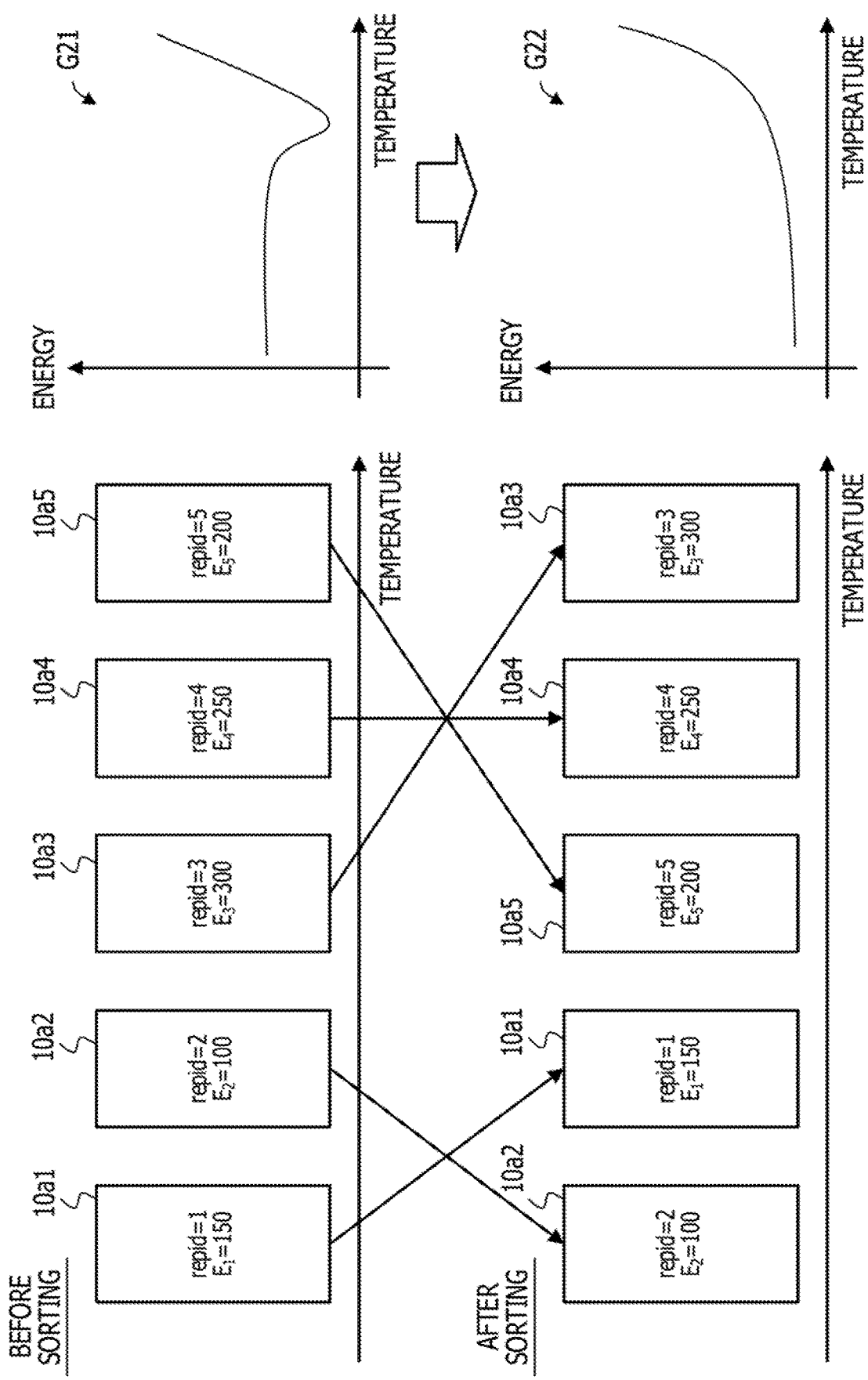
FIG. 14 is a diagram illustrating a second example of temperature energy-order sorting.

FIG. 14 is a diagram illustrating a second example of the temperature energy-order sorting.

In the example of FIG. 14, the temperature energy-order sorting for the search units 10a1, 10a2, 10a3, 10a4, and 10a5 is considered. The identification information of the search units 10a1 to 10a5 is represented as "repid". The search unit 10a is repid=1. The search unit 10a2 is repid=2. The search unit 10a3 is repid=3. The search unit 10a4 is repid=4. The search unit 10a5 is repid=5.

A graph G21 illustrates the relationship between the temperature (horizontal axis) of each search unit and the energy (vertical axis) corresponding to the bit states of each search unit at a certain timing (before sorting by the temperature energy-order sorting unit 24). Specifically, for example, the energy $E_1$ of the search unit 10a1=150. The energy $E_2$ of the search unit 10a2=100. The energy $E_3$ of the search unit 10a3=300. The energy $E_4$ of the search unit 10a4=250. The energy $E_5$ of the search unit 10a5=200. Furthermore, assume that the set temperatures are higher in the order of the search units 10a1, 10a2, 10a3, 10a4, and 10a5.

The temperature energy-order sorting unit 24 sorts the search units 10a1 to 10a5 in ascending energy order. The arrangement of the search units 10a to 10a5 after being sorted is the search units 10a2, 10a1, 10a, 10a4, and 10a3. Then, the temperature energy-order sorting unit 24 determines temperatures to be set for the search units 10a1 to 10a so that the temperatures are higher in the order of the search units 10a2, 10a1, 105, 10a4, and 10a3.

A graph G22 illustrates the relationship between the temperature (horizontal axis) of each search unit and the energy (vertical axis) corresponding to the bit states of each search unit after the temperature determination by the temperature energy-order sorting unit 24. The temperature control unit 22a sets the temperature of each search unit determined by the temperature energy-order sorting unit 24 for the search unit, so that a lower temperature can be set for a search unit with a lower energy.

Next, a processing procedure of the optimization device 3 will be described.

Figure 15:
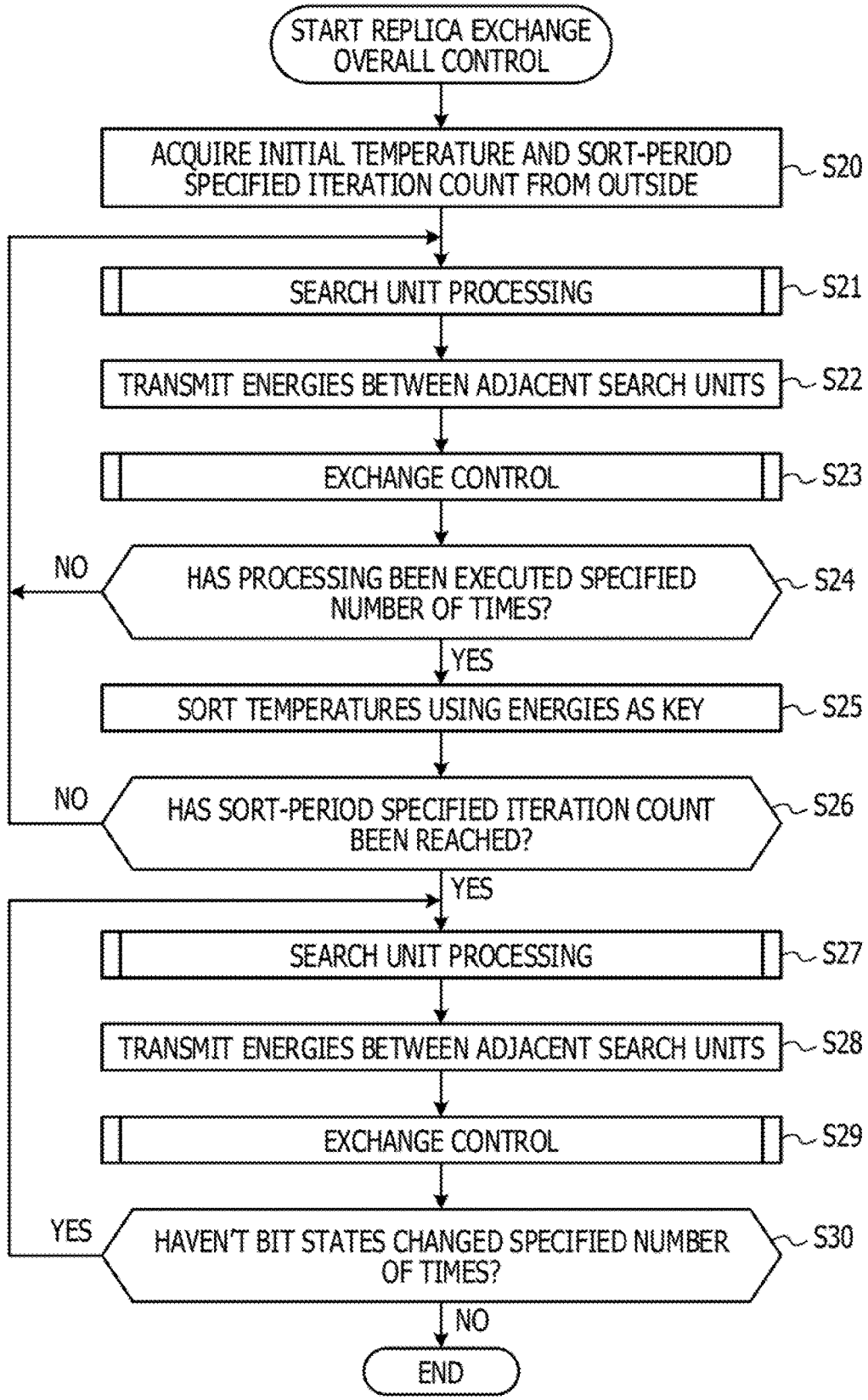
FIG. 15 is a flowchart illustrating an overall control example of replica exchange.

FIG. 15 is a flowchart illustrating an overall control example of replica exchange.

(S20) The overall control unit 21a acquires initial temperature and the sort-period specified iteration count as input data from the outside. The overall control unit 21a outputs to the temperature control unit 22a the start signal including the initial temperature and the sort-period specified iteration count. The temperature control unit 22a sets an iteration counter to zero.

(S21) Upon receiving the start signal from the overall control unit 21a, the temperature control unit 22a sets temperatures by outputting the temperature information indicating the initial temperature and the temperature setting signal to each of the search units 10a1 to 10aN, and causes each of the search units 10a1 to 10aN to execute probabilistic search processing. The processing by each of the search units 10a1 to 10aN (search unit processing) has already been described with reference to FIG. 8, and thus will not be described.

(S22) The search units 10a1 to 10aN transmit energies between the adjacent search units to the temperature control unit 22a. The temperature control unit 22a acquires the energy values calculated by the search units 10a1 to 10aN for each pair of search units with adjacent temperatures.

(S23) The temperature control unit 22a performs temperature exchange control according to the exchange probability based on Equation (5) using the energy difference between the search units with adjacent temperatures. The temperature control unit 22a performs the temperature exchange control on each pair of search units with adjacent temperatures. Details of the exchange control will be described later.

(S24) The temperature control unit 22a determines whether a processing set of the search unit processing and the exchange control has been executed a specified number of times. If the processing set has been executed the specified number of times, the process proceeds to step S25. If the processing set has not been executed the specified number of times, the process proceeds to step S21.

(S25) The temperature energy-order sorting unit 24 sorts the temperatures set for the search units, using the energies in the search units as a key. The temperature energy-order sorting unit 24 determines a temperature for each search unit so that lower temperatures are assigned in ascending energy order. The temperature energy-order sorting unit 24 outputs temperature order information indicating the temperature set for each search unit to the temperature control unit 22a. The temperature control unit 22a increments the iteration counter.

(S26) The temperature control unit 22a determines whether the value of the iteration counter has reached the sort-period specified iteration count. If the sort-period specified iteration count has been reached, the process proceeds to step S27. If not, the process proceeds to step S21. Note that the iteration counter may be provided to the temperature energy-order sorting unit 24 so that the temperature energy-order sorting unit 24 executes the determination in step S26.

(S27) The temperature control unit 22a sets the temperatures by outputting new temperature information and the temperature setting signal to each of the search units 10a1 to 10aN, and causes each of the search units 10a1 to 10aN to execute the probabilistic search (ground state search) processing. The processing by each of the search units 10a1 to 10aN (search unit processing) has already been described with reference to FIG. 8, and thus will not be described.

(S28) The search units 10a1 to 10aN transmit energies between the adjacent search units to the temperature control unit 22a. The temperature control unit 22a acquires the energy values calculated by the search units 10a1 to 10aN for each pair of search units with adjacent temperatures.

(S29) The temperature control unit 22a performs the temperature exchange control according to the exchange probability based on Equation (5) using the energy difference between the search units with adjacent temperatures. The temperature control unit 22a performs the temperature exchange control on each pair of search units with adjacent temperatures. Details of the exchange control will be described later.

(S30) The overall control unit 21a acquires the bit states from the search units 10a1 to 10aN, and determines whether the bit states in the search unit with the minimum temperature have not changed a specified number of times. When the bit states in the search unit with the minimum temperature have not changed, the overall control unit 21a completes the overall control processing of replica exchange. If the bit states in the search unit with the minimum temperature have changed, the overall control unit 21a proceeds the process to step S27 and continues the probabilistic search processing.

For example, when the overall control processing of replica exchange is completed, the overall control unit 21a outputs the bit states in the search unit with the minimum temperature as a solution to the optimization problem. Alternatively, the overall control unit 21a may output the bit states with the lowest energy obtained in the overall control process of replica exchange as a solution to the optimization problem.

Figure 16:
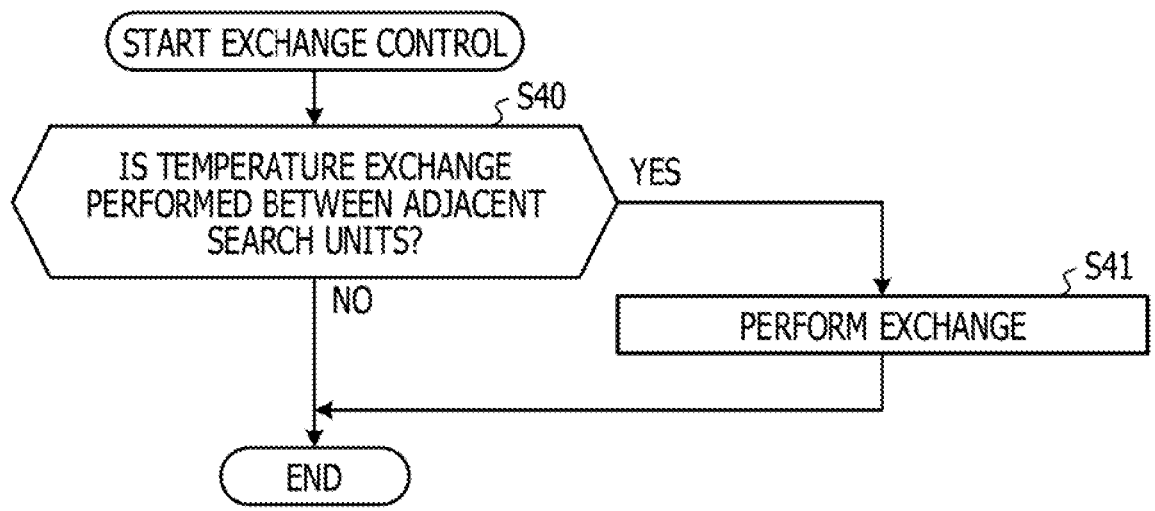
FIG. 16 is a flowchart illustrating an exchange control example.

FIG. 16 is a flowchart illustrating an exchange control example.

The exchange control corresponds to steps S23 and S29.

(S40) The temperature control unit 22a determines whether to perform a temperature exchange between search units with adjacent set temperatures. The temperature control unit 22a determines whether to perform an exchange for each pair of search units, based on the exchange probability of Equation (5). When an exchange is performed on a certain pair of search units, the process proceeds to step S41. When no exchange is performed on any pair of search units, the exchange control is completed.

(S41) The temperature control unit 22a performs a temperature exchange on the pair of search units on which it is determined that an exchange be performed in step S40. The temperature control unit 22a does not perform a temperature exchange on the pair of search units on which it is determined that no exchange be performed in step S40. Then, the exchange control is completed.

Here, as an example of one exchange processing (exchange processing executed at one exchange timing) in step S41, the first to fifth patterns described as examples in the second embodiment may be used. However, the temperature control unit 22a may execute the exchange processing using other patterns.

Figure 17A:
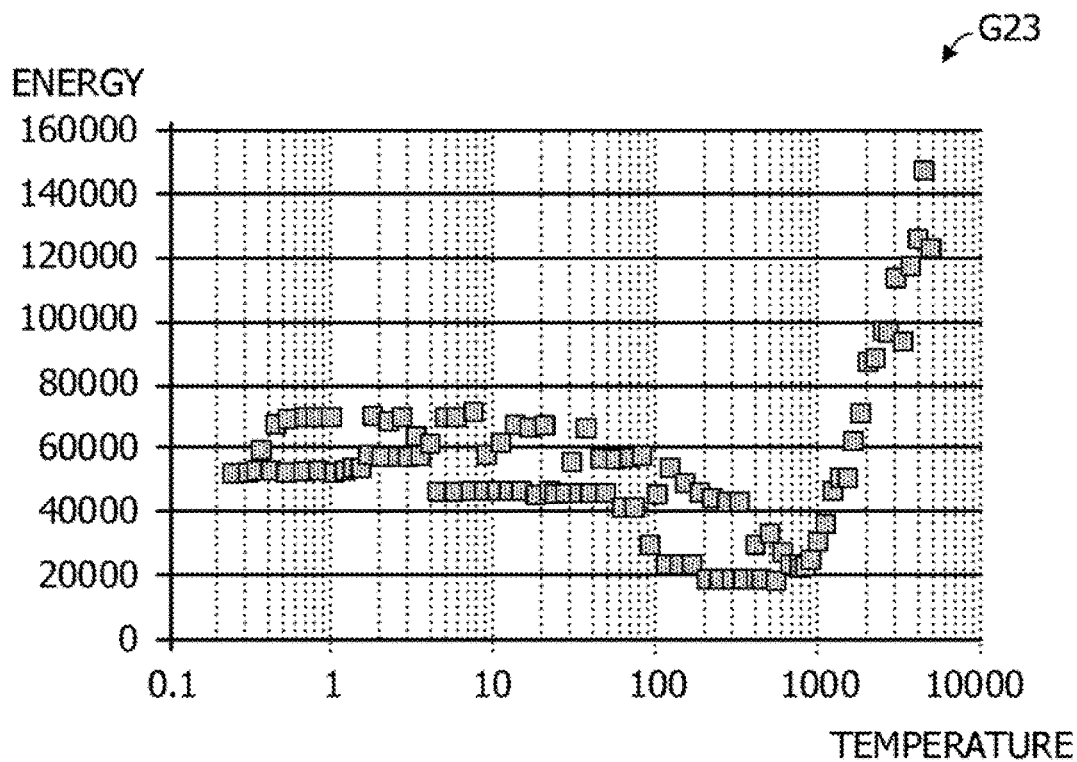
FIGS. 17A and 17B are diagrams illustrating examples of the relationship between temperature and energy of solutions.
Figure 17B:
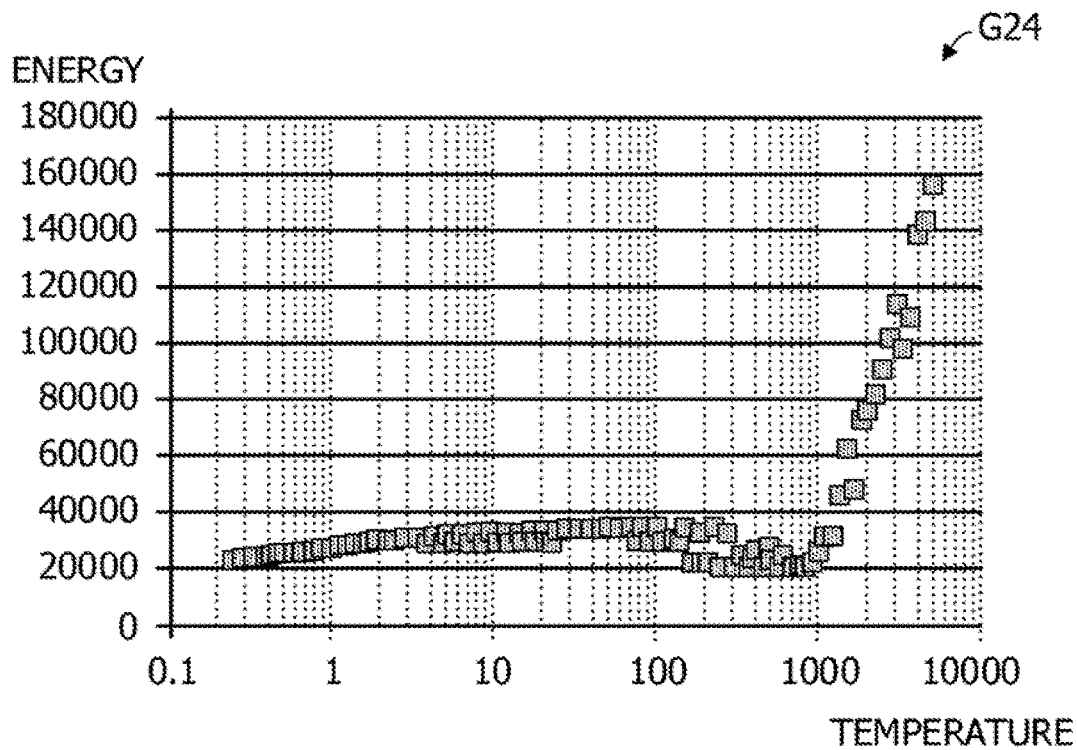

FIGS. 17A and 17B are diagrams illustrating examples of the relationship between temperature and energy of solutions.

FIG. 17A illustrates a graph G23 of a comparative example where no sorting is performed by the temperature energy-order sorting unit 24 (without sorting). FIG. 17B illustrates a graph G24 when sorting is performed by the temperature energy-order sorting unit 24 (with sorting). Each of the graphs G23 and G24 illustrates the relationship between temperatures set for the search units and energies corresponding to solutions (bit states) obtained from the search units. The horizontal axis of each of the graphs G23 and G24 is temperature, and the vertical axis is energy.

The graph G23 are results when normal replica exchange is performed, and the iteration count of the probabilistic search has reached 10,000 without sorting by the temperature energy-order sorting unit 24. The graph G24 are results when the specified count in FIG. 15 is set to 1,000 (in this case, the specified iteration count in the probabilistic search (search unit processing in FIG. 8) is 1,000 or less, and the iteration count has reached 10,000.

Comparison between the graphs G23 and G24 shows that more search units have lower energies when sorting is performed than when no sorting is performed.

As described above, the optimization device 3 can speed up a search for the ground state by performing control such that a lower temperature is assigned to a lower energy state when executing a replica exchange in the first half of the total iteration.

Note that as a hardware configuration of the optimization device 3, the same configuration as that of the optimization device 2a Illustrated in FIG. 10 is possible. For example, the function of the temperature energy-order sorting unit 24 may be implemented by a computer including a CPU and RAM.

Fourth Embodiment

Next, a fourth embodiment will be described. Matters different from the above-described second and third embodiments will be mainly described, and descriptions of common matters will be omitted.

In the fourth embodiment, an example will be described in which the functions described in the second embodiment and the functions described in the third embodiment are used in combination.

Figure 18:
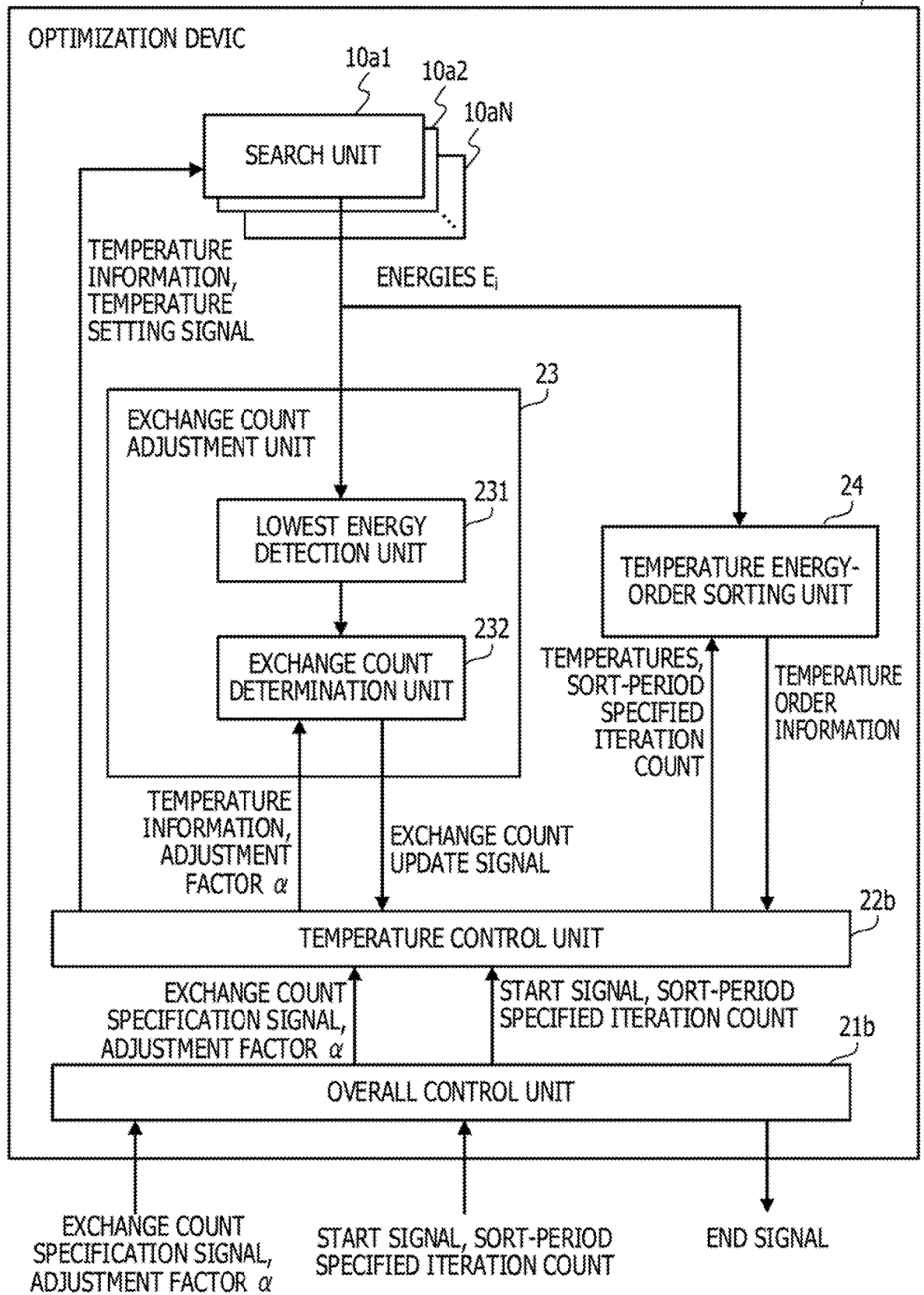
FIG. 18 is a diagram illustrating a circuit configuration example of an optimization device according to a fourth embodiment.

FIG. 18 is a diagram illustrating a circuit configuration example of an optimization device according to the fourth embodiment.

An optimization device 4 is implemented using, for example, a semiconductor integrated circuit such as an FPGA. The optimization device 4 includes search units 10a1 to 10aN, an overall control unit 21b, a temperature control unit 22b, an exchange count adjustment unit 23, and a temperature energy-order sorting unit 24.

The search units 10a1 to 10aN have the same circuit configuration as the search units 10a1 to 10aN illustrated in FIG. 2, and thus will not be described.

The overall control unit 21b controls the overall operation of the optimization device 4. The overall control unit 21b has the functions of the above-described overall control units 21 and 21a.

The overall control unit 21b receives the input of an exchange count specification signal indicating the initial value of a temperature exchange count, and an adjustment factor $\alpha$ ($0 < \alpha \leq 1$) from the outside. Furthermore, the overall control unit 21b receives the input of a sort-period specified iteration count together with a start signal. Then, the overall control unit 21b outputs to the temperature control unit 22b the start signal, the sort-period specified iteration count, the exchange count specification signal, and the adjustment factor $\alpha$, and activates the search units 10a1 to 10aN to cause them to start the operation of a ground state search on an optimization problem.

When the operation is completed, the overall control unit 21b acquires bit states from each of the search units 10a1 to 10aN to obtain a solution to the optimization problem. The overall control unit 21b outputs an end signal indicating the completion of the operation. The end signal may include information indicating the solution obtained by the operation. For example, the overall control unit 21b may output image information indicating the solution to a display device connected to the optimization device 4, and cause the display device to display the image information indicating the solution, thereby presenting the content of the obtained solution to a user.

The temperature control unit 22b controls a temperature provided to each of the search units 10a1 to 10aN. The temperature control unit 22b has the functions of the above-described temperature control units 22 and 22a. The temperature control unit 22b provides temperature information indicating the temperature and a temperature setting signal (T set sig.) to the state transition determination circuits included in each of the search units 10a1 to 10aN.

Furthermore, the temperature control unit 22b controls the exchange of temperatures (temperature exchange) in the search units 10a1 to 10aN. The temperature control unit 22b determines whether to perform a temperature exchange (e.g., for example, a replica exchange) for a pair of search units (a set of two search units) with adjacent temperatures, based on the exchange probability of Equation (5), on a pair-by-pair basis. The temperature control unit 22b provides the exchanged temperature to each search unit. The initial value of the temperature exchange count with the exchange timing is provided by the overall control unit 21b. Furthermore, the temperature exchange count with the exchange timing is updated by the exchange count adjustment unit 23.

Moreover, the temperature control unit 22b sets a temperature for each search unit determined by the temperature energy-order sorting unit 24 for the search unit each time a specified number of replica exchanges are performed until a sort-period specified iteration count of the total iteration has been reached since the first time.

The exchange count adjustment unit 23 adjusts the count of temperature exchanges by the temperature control unit 22b in a predetermined replica exchange cycle. The exchange count adjustment unit 23 includes a lowest energy detection unit 231 and an exchange count determination unit 232.

The lowest energy detection unit 231 detects the lowest energy of the energies provided from the search units 10a1 to 10aN at the exchange timing based on the replica exchange cycle.

The exchange count determination unit 232 determines the temperature exchange count, based on the temperature of a search unit corresponding to the lowest energy detected by the lowest energy detection unit 231, the temperature of each of the search units 10a1 to 10aN provided from the temperature control unit 22b, and the adjustment factor $\alpha$. The exchange count determination unit 232 outputs an exchange count update signal indicating the determined exchange count to the temperature control unit 22b.

The temperature energy-order sorting unit 24 acquires the temperature set for each search unit and the sort-period specified iteration count from the temperature control unit 22*b*. Furthermore, the temperature energy-order sorting unit 24 acquires the energies $E_i$ (i=1 to N) from the search units 10*a*1 to 10*a*N. The temperature energy-order sorting unit 24 assigns lower temperatures in ascending energy order each time the specified number of replica exchanges are performed until a first sort-period specified iteration count of the total iteration is reached. In other words, for example, the temperature energy-order sorting unit 24 sorts the temperatures in energy order using the temperature and energy of each search unit as input, and determines a temperature to be set for each search unit. The temperature energy-order sorting unit 24 outputs temperature order information indicating the temperature set for each search unit to the temperature control unit 22*b*.

Next, a processing procedure of the optimization device 4 will be described.

Figure 19:
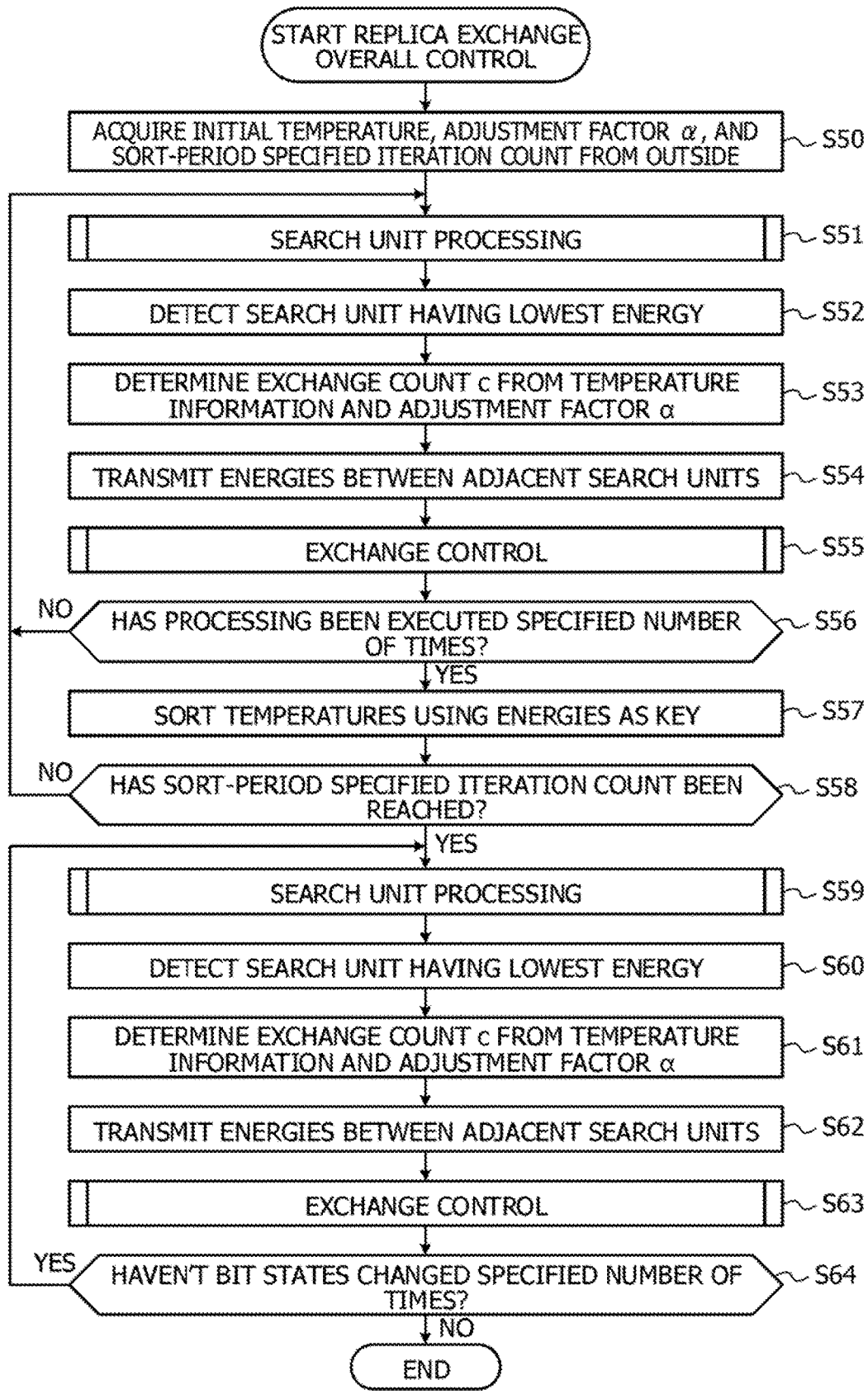
FIG. 19 is a flowchart illustrating an overall control example of replica exchange.

FIG. 19 is a flowchart illustrating an overall control example of replica exchange.

(S50) The overall control unit 21*b* acquires initial temperature, the adjustment factor α, and the sort-period specified iteration count as input data from the outside. Furthermore, the overall control unit 21*b* acquires the exchange count specification signal indicating the initial value of the exchange count from the outside. The overall control unit 21*b* outputs to the temperature control unit 22*b* the start signal including the initial temperature, the exchange count specification signal, the adjustment factor α, and the sort-period specified iteration count. The temperature control unit 22*b* sets an iteration counter to zero.

(S51) Upon receiving the start signal from the overall control unit 21*a*, the temperature control unit 22*b* sets temperatures by outputting the temperature information indicating the initial temperature and the temperature setting signal to each of the search units 10*a*1 to 10*a*N, and causes each of the search units 10*a*1 to 10*a*N to execute probabilistic search processing. The processing by each of the search units 10*a*1 to 10*a*N (search unit processing) has already been described with reference to FIG. 8, and thus will not be described.

(S52) When each of the search units 10*a*1 to 10*a*N executes the probabilistic search for a specified time or a specified iteration count, the exchange count adjustment unit 23 acquires the energy value from each of the search units 10*a*1 to 10*a*N, and detects a search unit having the lowest energy.

(S53) The exchange count adjustment unit 23 acquires the temperature set for each of the search units 10*a*1 to 10*a*N and the adjustment factor α from the temperature control unit 22*b*. The exchange count adjustment unit 23 determines the exchange count c, based on the minimum temperature of the temperatures set for the search units 10*a*1 to 10*a*N, the adjustment factor α, and the temperature set for the search unit having the lowest energy. For example, the exchange count adjustment unit 23 detects the lowest energy and the search unit having the lowest energy by the function of the lowest energy detection unit 231. Further, the exchange count adjustment unit 23 determines the exchange count c by calculating the exchange count c=max(cnt×α, 1) by the function of the exchange count determination unit 232. As described above, cnt indicates what number the search unit having the lowest energy is when counted from the search unit with the minimum temperature in temperature order. The exchange count adjustment unit 23 outputs the exchange count update signal indicating the determined exchange count c to the temperature control unit 22*b*. The temperature control unit 22*b* Initializes the number of counts of the exchange count to zero.

(S54) The search units 10*a*1 to 10*a*N transmit energies between the adjacent search units to the temperature control unit 22*b*. The temperature control unit 22*b* acquires the energy values calculated by the search units 10*a*1 to 10*a*N for each pair of search units with adjacent temperatures.

(S55) The temperature control unit 22*b* performs temperature exchange control according to the exchange probability based on Equation (5) using the energy difference between the search units with adjacent temperatures. The temperature control unit 22*b* performs the temperature exchange control for each pair of search units with adjacent temperatures. Details of the exchange control will be described later.

(S56) The temperature control unit 22*b* determines whether a processing set of the search unit processing and the exchange control has been executed a specified number of times. If the processing set has been executed the specified number of times, the process proceeds to step S57. If the processing set has not been executed the specified number of times, the process proceeds to step S51.

(S57) The temperature energy-order sorting unit 24 sorts the temperatures set for the search units, using the energies in the search units as a key. The temperature energy-order sorting unit 24 determines a temperature for each search unit so that lower temperatures are assigned in ascending energy order. The temperature energy-order sorting unit 24 outputs temperature order information indicating the temperature set for each search unit to the temperature control unit 22*b*. The temperature control unit 22*b* increments the iteration counter.

(S58) The temperature control unit 22*b* determines whether the value of the iteration counter has reached the sort-period specified iteration count. If the sort-period specified iteration count has been reached, the process proceeds to step S59. If not, the process proceeds to step S51. Note that the iteration counter may be provided to the temperature energy-order sorting unit 24 so that the temperature energy-order sorting unit 24 executes the determination in step S58.

(S59) The temperature control unit 22*b* sets the temperatures by outputting new temperature information and the temperature setting signal to each of the search units 10*a*1 to 10*a*N, and causes each of the search units 10*a*1 to 10*a*N to execute the probabilistic search (ground state search) processing.

(S60) When each of the search units 10*a*1 to 10*a*N has executed the probabilistic search for the specified time or the specified iteration count, the exchange count adjustment unit 23 acquires the energy value from each of the search units 10*a* to 10*a*N, and detects a search unit having the lowest energy.

(S61) The exchange count adjustment unit 23 acquires the temperature set for each of the search units 10*a*1 to 10*a*N and the adjustment factor α from the temperature control unit 22*b*. The exchange count adjustment unit 23 determines the exchange count c, based on the minimum temperature of the temperatures set for the search units 10*a*1 to 10*a*N, the adjustment factor α, and the temperature set for the search unit having the lowest energy. The method of determining the exchange count c is the same as that in step S53.

(S62) The search units 10*a*1 to 10*a*N transmit energies between the adjacent search units to the temperature control unit 22*b*. The temperature control unit 22*b* acquires the energy values calculated by the search units 10*a*1 to 10*a*N for each pair of search units with adjacent temperatures.

(S63) The temperature control unit 22b performs temperature exchange control according to the exchange probability based on Equation (5) using the energy difference between the search units with adjacent temperatures. The temperature control unit 22b performs the temperature exchange control for each pair of search units with adjacent temperatures. Details of the exchange control will be described later.

(S64) The overall control unit 21b acquires the bit states from the search units 10a1 to 10aN, and determines whether the bit states in the search unit with the minimum temperature have not changed a specified number of times. When the bit states in the search unit with the minimum temperature have not changed, the overall control unit 21b completes the overall control processing of replica exchange. If the bit states in the search unit with the minimum temperature have changed, the overall control unit 21b proceeds the process to step S59 and continues the probabilistic search processing.

For example, when the overall control processing of replica exchange is completed, the overall control unit 21b outputs the bit states in the search unit with the minimum temperature as a solution to the optimization problem. Alternatively, the overall control unit 21b may output the bit states with the lowest energy obtained in the overall control process of replica exchange as a solution to the optimization problem.

In the above example, the optimization device 4 determines the exchange count c each time the search unit processing in step S51 or step S59 is completed, but may determine the exchange count c after the search unit processing is repeated a plurality of times. Furthermore, the optimization device 2 may determine the exchange count c in the first half of the total iteration, and use the exchange count c determined in the first half in the second half of the total iteration without performing new determination of the exchange count c. For example, it is possible to skip steps S60 and S61 (not to execute steps S60 and S61).

Figure 20:
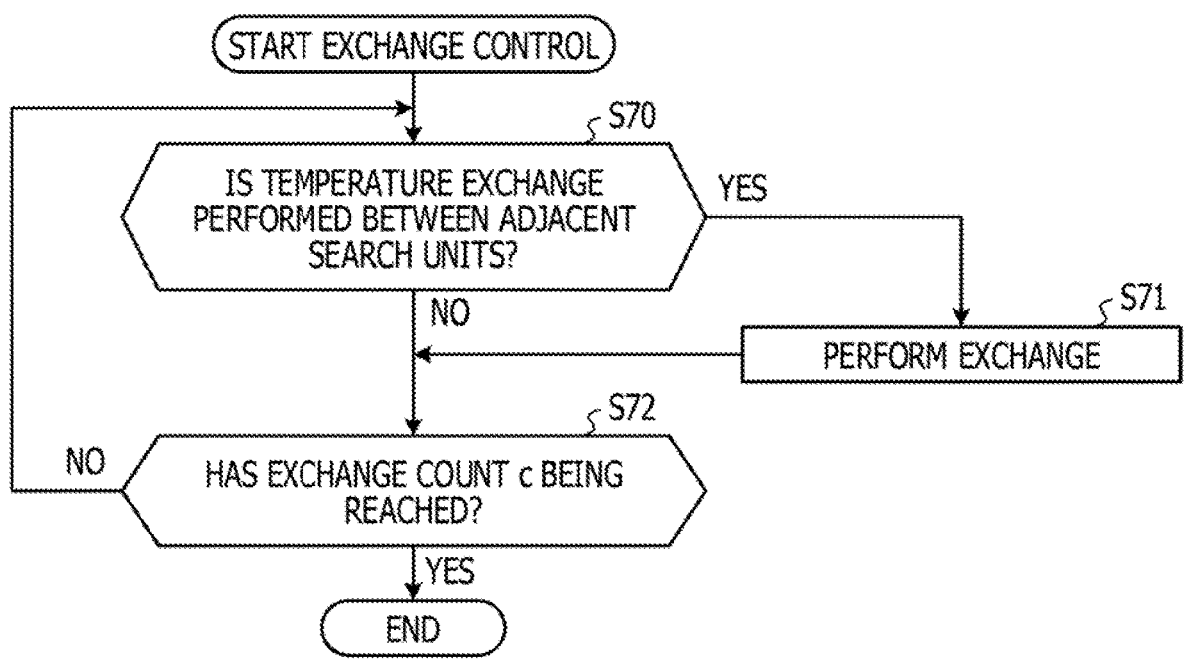
FIG. 20 is a flowchart illustrating an exchange control example.

FIG. 20 is a flowchart illustrating an exchange control example.

The exchange control corresponds to steps S55 and S63.

(S70) The temperature control unit 22b increments the number of counts of the exchange count, and determines whether to perform a temperature exchange between search units with adjacent set temperatures. The temperature control unit 22b determines whether to perform an exchange for each pair of search units, based on the exchange probability of Equation (5). When an exchange is performed on a certain pair of search units, the process proceeds to step S71. If no exchange is performed on the pair of search units, the process proceeds to step S72.

(S71) The temperature control unit 22b performs a temperature exchange on the pair of search units on which it is determined that an exchange be performed in step S70. The temperature control unit 22b does not perform a temperature exchange on the pair of search units on which it is determined that no exchange be performed in step S70.

(S72) The temperature control unit 22b determines whether the number of counts of the temperature exchange count has reached c. If the number of counts of the exchange count has reached c, the exchange control is completed. If the number of counts of the exchange count has not reached c, the process proceeds to step S70.

As described above, when the output of the energy value by each of the search units 10a1 to 10aN and temperature exchange for the determined exchange count have been performed the specified number of times, the temperature control unit 22b performs the processing to set a lower temperature for a search unit that has output a lower energy value (temperature energy-order sorting). The temperature control unit 22b performs the temperature energy-order sorting processing in a first period of the entire period of the ground state search by the search units 10a1 to 10aN, and does not perform the sorting processing of temperature energy-order sorting in a second period after the first period.

When executing a replica exchange in the second half of the total iteration, the optimization device 4 performs only a normal replica exchange without determining a set temperature for each search unit by the temperature energy-order sorting unit 24. Thus, the operation can be speeded up, moving the states of the search units appropriately toward the ground state.

Here, as an example of one exchange processing (exchange processing executed at one exchange timing) in step S71, the first to fifth patterns described as examples in the second embodiment may be used. However, the temperature control unit 22b may execute the exchange processing using other patterns.

As described as an example in the fourth embodiment, the optimization device 4 has the functions described in the second and third embodiments. That is, for example, the optimization device 4 determines the exchange count of replica exchanges based on the difference between the temperature of a search unit having the lowest energy and the minimum temperature. Furthermore, the optimization device 4 performs control to assign a lower temperature to a lower energy state when executing replica exchange in the first half of the total iteration. This allows a search for the ground state to be further speeded up.

Note that as a hardware configuration of the optimization device 4, the same configuration as that of the optimization device 2a Illustrated in FIG. 10 is possible. For example, the functions of the exchange count adjustment unit 23 and the temperature energy-order sorting unit 24 may be implemented by a computer including a CPU and RAM.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimization device comprising:
a memory;
a processor coupled to the memory; and
a plurality of search circuits configured to each being set a temperature based on information, determine, based on a plurality of weight values each indicating strength of connection between two state variables of a plurality of states variables each indicating spin bit and values of the two state variables, a plurality of energy change values each corresponding to a change in respective combinations of two state variables of the plurality of state variables, add an offset value to each of the plurality of energy change values to obtain an added value, determine values of the plurality of state variables corresponding to a spin bit to be flipped based on results of comparison between the added value and a noise value corresponding to the temperature, flip the spin bit of the determined values and calculate an energy value based on the plurality of state variables after a flip operation, the processor is configured to:
- detect a search circuit having the lowest energy value;
- determine an exchange count, based on a difference between a temperature set for the search circuit corresponding to the lowest energy value and a minimum temperature that is the lowest temperature of temperatures set for the plurality of search circuits;
- set the temperature for each of the plurality of search circuits; and
- exchange the set temperatures between the plurality of search circuits for the exchange count based on an exchange probability.

2. The optimization device according to claim 1, wherein the processor is configured to increase the exchange count as the difference increases.

3. The optimization device according to claim 1, wherein the processor is configured to acquire as the difference the number of set temperatures from the minimum temperature to the temperature set for the search circuit corresponding to the lowest energy value.

4. The information processing device according to claim 3, wherein the processor is configured to determine a value obtained by multiplying the number by a coefficient as the exchange count.

5. The optimization device according to claim 1, wherein when output of the energy values by the plurality of search circuits and temperature exchange for the exchange count have been performed a specified number of times, the processor is configured to perform processing to set a lower temperature for a search circuit that has output a lower energy value.

6. The optimization device according to claim 5, wherein the processor is configured to perform the processing in a first period of an entire period of a ground state search by the plurality of search circuits, and does not perform the processing in a second period after the first period.

7. A method of controlling an optimization device comprising:
- by a plurality of search circuits of the optimization device each being set a temperature based on information, determining, based on a plurality of weight values each indicating strength of connection between two state variables of a plurality of states variables each indicating spin bit and values of the two state variables, a plurality of energy change values for a plurality of combinations of the two state variables, adding an offset value to each of the plurality of energy change values to obtain an added value, determining values of the plurality of state variables corresponding to a spin bit to be flipped based on results of comparison between the added value and a noise value corresponding to the temperature, flipping the spin bit of the determined values and calculating an energy value based on the plurality of state variables after a flip operation;
- detecting a search circuit having the lowest energy value;
- determining an exchange count, based on a difference between a temperature set for the search circuit corresponding to the lowest energy value and a minimum temperature that is the lowest temperature of temperatures set for the plurality of search circuits;
- setting the temperature for each of the plurality of search circuits; and
- exchanging the set temperatures between the plurality of search circuits for the exchange count based on an exchange probability.

* * * * *